(12) United States Patent
Gerson et al.

(10) Patent No.: US 9,776,763 B2
(45) Date of Patent: Oct. 3, 2017

(54) STRAINER DISPENSER AND METHOD OF USE

(71) Applicant: Louis M. Gerson Co., Inc., Middleboro, MA (US)

(72) Inventors: Ronald L. Gerson, Middleboro, MA (US); Robert A. Brunell, Forestdale, MA (US); Pierre LaPointe, Marlborough, MA (US); Michael H. McCombe, Lakeville, MA (US)

(73) Assignee: Louis M. Gerson Co., Inc., Middleboro, MA (US)

( * ) Notice: Subject to any disclaimer, the term of this patent is extended or adjusted under 35 U.S.C. 154(b) by 0 days.

(21) Appl. No.: 14/833,380

(22) Filed: Aug. 24, 2015

(65) Prior Publication Data

US 2015/0360812 A1    Dec. 17, 2015

Related U.S. Application Data

(62) Division of application No. 13/576,283, filed as application No. PCT/US2010/038834 on Jun. 16, 2010, now Pat. No. 9,113,727.

(30) Foreign Application Priority Data

Aug. 18, 2009 (WO) ................ PCT/US2009/054103

(51) Int. Cl.
*B65H 1/00* (2006.01)
*B65D 21/02* (2006.01)
(Continued)

(52) U.S. Cl.
CPC ....... *B65D 21/0209* (2013.01); *B01D 29/085* (2013.01); *B05B 15/00* (2013.01);
(Continued)

(58) Field of Classification Search
CPC ....... A47F 1/085; A47F 1/65; B65D 21/0209; B01D 29/085
(Continued)

(56) References Cited

U.S. PATENT DOCUMENTS 1,151,064 A * 8/1915 Swift ................ B65D 83/0805
                                                 221/306
1,429,701 A   9/1922 Stephens
(Continued)

FOREIGN PATENT DOCUMENTS

JP      2005-343475     12/2005
KR      20-0345911      3/2004
(Continued)

*Primary Examiner* — Rakesh Kumar
(74) *Attorney, Agent, or Firm* — Occhiuti & Rohlicek LLP

(57) ABSTRACT

A method of loading stacked strainers in a dispenser while minimizing strainer contamination is disclosed. The method includes providing a stack of strainers that is enclosed in a protective material to form a pod, placing the pod within a dispenser, and removing the protective material from the pod of strainers while the strainers are in the dispenser. The strainers dispensed from the thus loaded dispenser avoid being contamination during loading. The protective material may be perforated to facilitate removal from the stack, and include an extended portion to be grasped during removal from the dispenser.

20 Claims, 18 Drawing Sheets

(51) Int. Cl.
  *B01D 29/085* (2006.01)
  *B05B 15/00* (2006.01)
  *B44D 3/10* (2006.01)
  *B65B 69/00* (2006.01)
  *B65D 65/02* (2006.01)
  *B65D 71/06* (2006.01)
  *B65D 75/54* (2006.01)
  *B65D 75/58* (2006.01)
  *A47F 1/08* (2006.01)

(52) U.S. Cl.
  CPC .............. *B05B 15/008* (2013.01); *B44D 3/10* (2013.01); *B65B 69/00* (2013.01); *B65D 65/02* (2013.01); *B65D 71/06* (2013.01); *B65D 75/54* (2013.01); *B65D 75/58* (2013.01); *A47F 1/085* (2013.01); *Y10T 29/49819* (2015.01)

(58) Field of Classification Search
  USPC .............. 220/23.8, 33, 44, 287, 45, 154, 63; 221/33, 44, 287, 45, 154, 63
  See application file for complete search history.

(56) References Cited

U.S. PATENT DOCUMENTS

| | | | | |
|---|---|---|---|---|
| 1,664,164 A * | 3/1928 | Endter | ............... | A47F 1/106 221/303 |
| 1,762,948 A | 6/1930 | Barbieri | | |
| 2,203,494 A * | 6/1940 | Greenhill | ............... | A47F 1/085 221/155 |
| 2,584,941 A * | 2/1952 | Taubert | ............... | A47F 1/085 221/45 |
| 2,896,788 A * | 7/1959 | Hoffberger | ............... | A47J 43/22 210/473 |
| 3,118,565 A * | 1/1964 | Chappory | ............... | A47F 1/085 221/197 |
| 3,462,044 A * | 8/1969 | McKenna | ............... | A47F 1/085 221/308 |
| 3,987,901 A * | 10/1976 | Dullinger | ............... | B65C 9/10 206/451 |
| 4,094,443 A | 6/1978 | Whelan | | |
| 4,220,541 A * | 9/1980 | Chang | ............... | A47J 31/08 210/474 |
| 4,239,125 A * | 12/1980 | Pawlowski | ............... | A47F 1/065 221/305 |
| 4,483,460 A | 11/1984 | Whelan | | |
| 4,484,694 A * | 11/1984 | Reuteman | ............... | G07F 11/04 221/197 |
| 5,104,538 A * | 4/1992 | Verreau | ............... | B01D 29/085 210/474 |
| 5,219,092 A * | 6/1993 | Morand | ............... | A47K 10/424 221/191 |
| 5,532,168 A * | 7/1996 | Marantz | ............... | C12M 45/02 210/473 |
| 7,507,379 B2 * | 3/2009 | Hunnell | ............... | B01L 9/52 206/460 |
| 7,669,732 B2 | 3/2010 | Njaastad | | |
| 8,152,004 B2 * | 4/2012 | Smith | ............... | A47F 1/10 211/70.7 |
| 2005/0197054 A1* | 9/2005 | Deitz | ............... | G07D 9/065 453/61 |
| 2013/0062343 A1* | 3/2013 | Gerson | ............... | A47J 31/08 220/23.83 |
| 2015/0360812 A1* | 12/2015 | Gerson | ............... | B01D 29/085 206/459.5 |

FOREIGN PATENT DOCUMENTS

| KR | 20-0348289 | 4/2004 |
|---|---|---|
| KR | 10-2004-0105373 | 12/2004 |

* cited by examiner

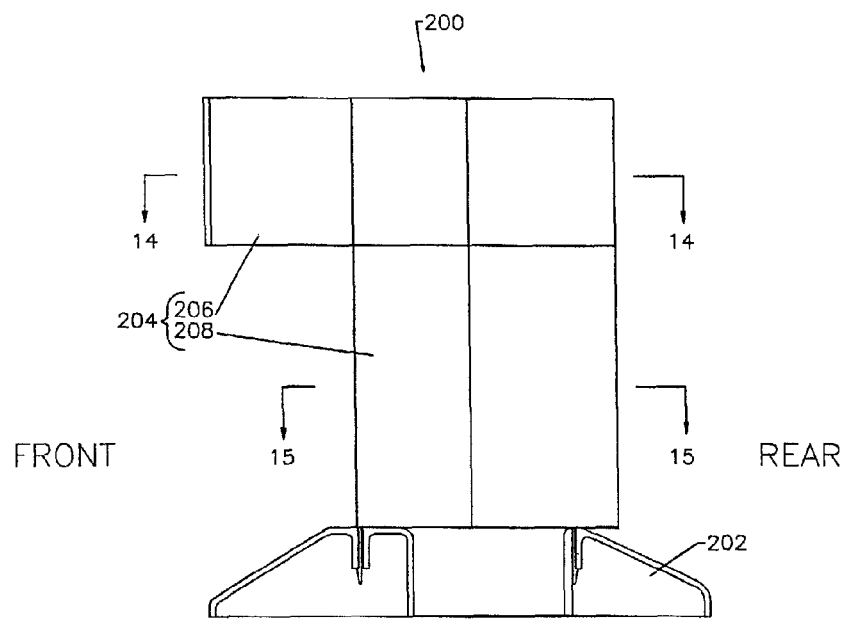
FIG 13
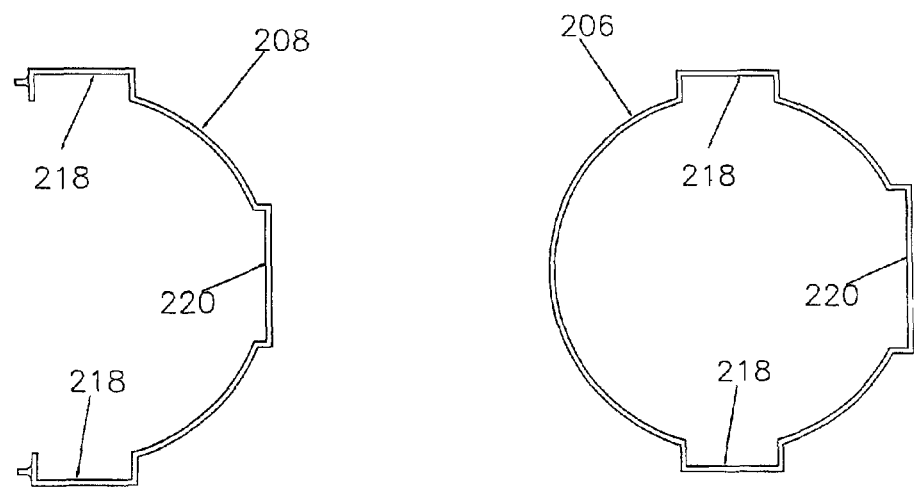
FIG 15
FIG 14

STRAINER DISPENSER AND METHOD OF USE

CROSS REFERENCE TO RELATED APPLICATIONS

This application is a divisional of U.S. application Ser. No. 13/576,283, filed Nov. 21, 2012, which is a National Stage of International Application No. PCT/US2010/038834, filed Jun. 16, 2010, which claims priority to International Application No. PCT/US2009/054103, filed Aug. 18, 2009, the contents of which are hereby incorporated by reference in their entirety.

FIELD OF THE INVENTION

The invention relates to a liquid strainer, more particularly to a paint strainer, to a method of loading a dispenser with paint strainers, and to a device for storing and dispensing same.

BACKGROUND OF THE INVENTION

Disposable paint strainers are used to filter paint that is to be sprayed from a spray gun, and consist of an impervious structure, usually a low-cost paper board body, with a filter insert. The strainer is usually produced in a conical shape, but this shape is not necessarily required. The conical strainer is typically placed in the opening of a spray gun cup and the paint is poured through the strainer and into the cup to filter the paint. Filtering both mixes the paint for best color match and strains any impurities that may clog a spray gun. If a spray gun clogs during use, the uniformity of the painting is compromised. Consequently, virtually all paint manufacturer's recommend filtering or straining paint that is used in spray guns. Such pre-filtering is recommended for paint used, for example, in auto body repair.

It is important to protect the strainer body and filter from dust, and to avoid touching the strainer filter with the hand or fingers. Dust can dislodge from the filter mesh, drop into the paint cup and can appear as blemishes on the surface of a car or can clog the spray gun. Touching of the filter can transfer body oils or contaminants on the hand to the filter and can result in spotting or "fish eyes" in the paint job, necessitating repainting. Modern paints, especially waterborne paints, are extremely sensitive to contamination by oils and silicone (dimenthylsiloxane), and touching of the filter must be avoided.

Strainers are typically supplied by the manufacturers in cases of 1,000 units. Internal packages within the case of 1000 strainers are typically bags containing 100 or 250 stacked, nested strainers. Strainers are typically supplied packed in a poly bag or overwrap to prevent contamination. Although satisfactory for transportation of the product, this type of packaging is less than desirable for the paint shop. The strainers must be stored in the paint shop, and oftentimes the painter will remove a stack of strainers from the bag and store them on a shelf. Not only does this permit dust to contaminate the strainer, but also the painter might typically remove a strainer in the stack by grasping the tip end, which can transfer both particulate and chemical contaminants from the painter's fingers to the filtering mesh of the strainer. However, even if the strainers are left in the bag, the bag may end up on a shelf or a workbench or even on the floor, where it can be damaged, knocked around or left open. A damaged or open package allows dust to enter the bag, and thus is not desirable. Also, in order to obtain a strainer for use, the painter must reach into the bag and pull out a strainer by hand. If the strainer is dispensed from the bag tip first, the painter is likely to touch and contaminate the outside of the filter.

Over the years, various types of dispensers have been developed to allow for more convenient storage of the strainers. These dispensers have been made from everything from low cost corrugated board to sheet metal. Some conventional dispensers are merely tubes that hold a stack of strainers, and the open ends of the tube do little to avoid exposure of the tip and filter area of the strainer to manual contamination or contamination from dust in the air. In some dispensers, the strainer is typically removed from the top of the dispenser or shipping box, with the painter reaching in to remove a strainer. If the dispenser is mounted at or near chest level, it is difficult to reach into the top of the dispenser, especially when the stack of strainers is almost used and the painter has to reach far down the tube or box to remove the strainer. To overcome this inconvenience s, some strainer dispensers have been made with slots down the front side so that the painter can grab the rim of a strainer and move it up the tube and out of the open top end. However, this slot leaves the carton open to contamination by dust and particles in the atmosphere. Some conventional dispensers are configured to have the strainers dispense from the bottom of the tube, but this has two drawbacks. First, having the strainers dispense from the dispenser bottom leaves the tip and filter of the strainer exposed to the atmosphere, allowing contamination from dust and particulates. Secondly, in order to dispense a strainer from the stack, the strainer is gripped by the tip or filter area of the strainer. This can physically damage the filter or weaken its bond to the paper and/or exposes the filter to contamination from body oils or other chemicals on the hands and fingers.

SUMMARY

A dispenser is provided that addresses the above problems with strainer storage and dispensing.

In some aspects, a method is provided of loading a stack of conical paint strainers within a dispenser while minimizing strainer contamination. The method includes the following steps: Providing the stack of strainers that is enclosed within a protective material. Placing the enclosed stack of strainers in the dispenser. Removing the protective material from the stack of strainers while the stack of strainers is in the dispenser.

The method may include one or more of the following features: The protective material is configured to be separable into individual portions, and the step of removing includes removing a first portion while the remaining protective material remains within the dispenser. The step of removing further includes subsequent removal of the remaining protective material from the dispenser. The protective material is perforated, and the protective material is separable along the perforation. At least a portion of the protective material is removed in a direction along a longitudinal axis of the stack and away from a conical tip of an outermost strainer of the stack of strainers. The direction is also towards an open end of an innermost strainer of the stack of strainers. The protective material extends beyond a conical tip of an outermost strainer of the stack of strainers to provide a gripping area that may be used to remove part of the protective wrapping.

In some aspects, a pod is provided. The pod includes a set of stacked conical containers, and a transparent covering which encloses the set, wherein the covering is configured to be separable into individual portions.

The pod may include one or more of the following features: The covering is perforated, and the covering is configured to be separable along the perforation. The covering includes a cylindrical portion at a first end and a conical portion at a second end opposed to the first end. The covering is imprinted with indicia which overlies the perforation and indicates the location of the perforation. The covering is imprinted with indicia to indicate a loading position for the pod. The perforation extends circumferentially. The covering is separable within the conical portion. The covering extends beyond a conical tip of an outermost strainer of the stack of strainers to provide a gripping area that may be used to remove part of the protective wrapping.

In some aspects, a hollow dispenser is provided for storing a nested stack of strainers and dispensing individual strainers from the stack. The dispenser includes opposed first and second ends, and spaced studs configured to support the stack and protruding inward from an inner surface of the dispenser, the studs being located in a region between a midpoint and second end of the dispenser.

The dispenser may include one or more of the following features: The studs are of uniform radial depth. The studs are asymmetrically shaped. Individual studs have a shape that is different from other studs. The studs are provided in an array in which the studs are arranged both in columns aligned with a longitudinal axis of the dispenser and in rows extending about a circumference of the dispenser. The studs are arranged in such a way so as to impart a tilt to the stack of strainers. The dispenser has an oval cross-sectional shape. The dispenser has a first door which closes the first end, a second door which closes the second end, and a third door that closes an opening formed in a sidewall extending between the first and second ends.

The above aspects provide a strainer having a dispensing tab, located on the outer surface of the strainer, which provides a manual grip area that allows the strainer to be withdrawn from its packaging or from a dispenser while avoiding direct contact with the strainer body or filter. Furthermore, the subject invention can be provided at no additional cost of material or labor during the manufacturing of the strainer.

If the strainer is packed in the traditional poly bag or poly tubing, the dispensing tab of the strainer can be can be conveniently grasped by the painter for removal from the stack within the bag. Furthermore, the removal will be from the tip end, which provides for easier removal than if the strainer is de-nested from the rim at its open end, in which case the rim or tabs on the strainer can catch in the soft plastic bag or film and interfere with removal.

The above aspects also include a dispensing unit which can be loaded with multiple stacked strainers, and allows the dispensing tab to be gripped for dispensing of the strainer from the bottom of the dispenser without direct contact with the filter portion of the strainer. The bottom-dispensing feature is more convenient than some conventional top-dispensers, can include a closable lower end that provides complete protection of the strainer during storage, and enables the strainer to be removed without direct contact of the tip and filter area.

A stack of strainers is wrapped in a protective material, creating a pod. The wrapping material is perforated in such a manner that enables the wrapping to be opened and removed from the stack of strainers once the stack is placed within the dispenser. For example, both the top and the bottom of the pod are sealed in order to provide dust-free storage and the protective material extends beyond the apex of the stack of strainers to provide a gripping area that may be used to remove part of the protective wrapping. By doing so, the pod of wrapped strainers can be placed within the dispenser without exposure of the strainer itself or the filter mesh to ambient particulates in the air and without the risk of contamination from body oils or substances on the hand of the painter. Ideally, the strainers have been manufactured by automated means to avoid touching of the filter mesh during production and the stack of strainers is packaged by automated means to avoid handling of the completed strainer and touching of the filter mesh. Automated production also minimizes the "open" time of the filter mesh in ambient air, reducing the time of exposure to particulates in the environment and lends itself to in-line cleaning and de-contamination of the strainer from any particulates that may have accumulated on the strainer mesh or blank during manufacturing. Nevertheless, the use of the protective wrapping to allow contamination-free placement within the dispenser is, in itself, of significant benefit.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

BRIEF DESCRIPTION OF THE DRAWINGS

FIG. 13 is a side view of the dispenser stand.

FIG. 14 is a sectional view of the stand across line 14-14 of FIG. 13.

FIG. 15 is a sectional view of the stand across line 15-15 of FIG. 13.

DETAILED DESCRIPTION

Figure 1:
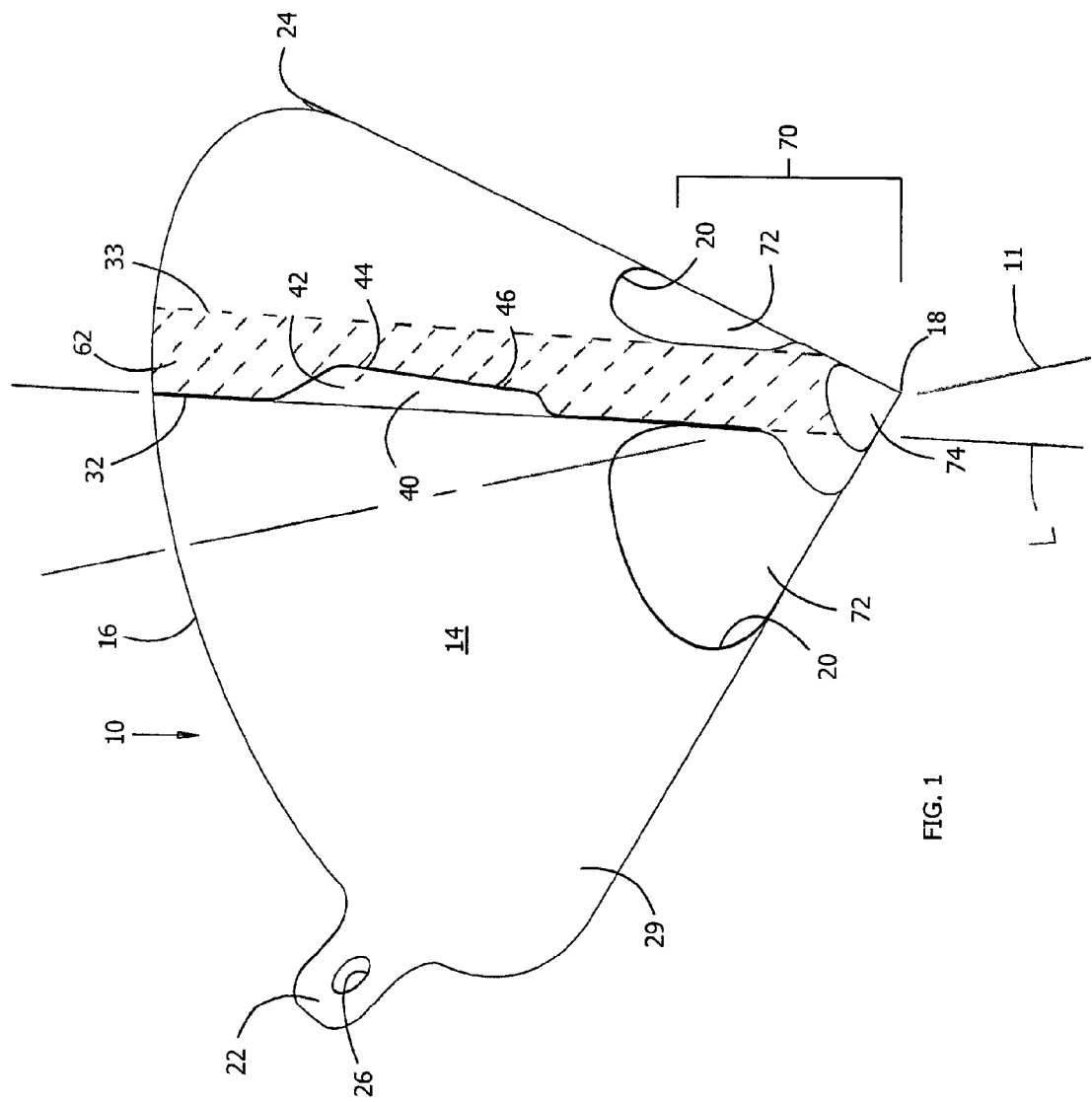
FIG. 1 is a side perspective view of a strainer according to the present invention.
Figure 1B:
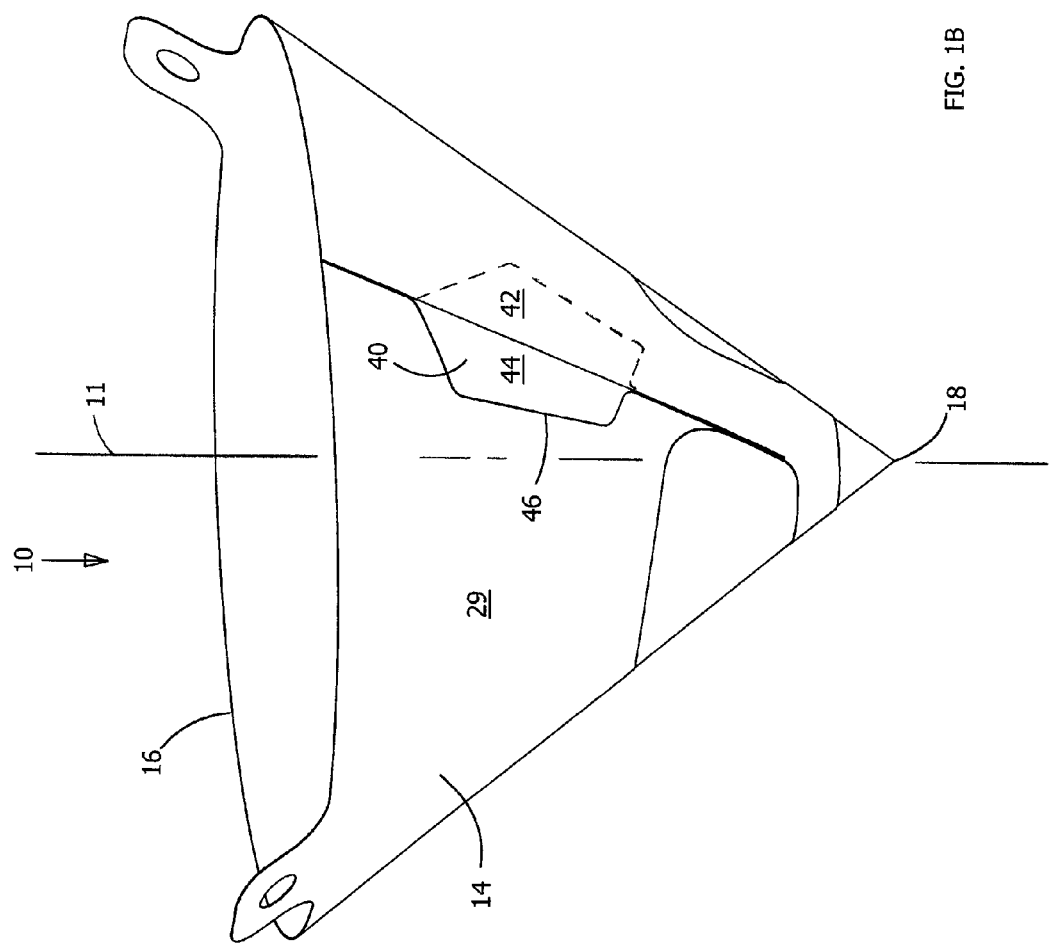
FIG. 1B is side perspective view of the strainer of FIG. 1.

Referring now to FIG. 1, a disposable liquid strainer 10 is shown which includes a hollow, conical body 14 having an open, generally circular end defined by a rim 16. The conical body tapers to an apex 18 that is opposed to the rim 16. The rim may include rim tabs 22, 24 that permit positioning and support of the strainer 10 or allow removal of the strainer from a spray gun cup by an area free of paint. The rim tabs 22, 24 extend outward from the rim 16 so as to extend the exterior surface 28 of the conical body 14. The rim tabs 22, 24 serve as handles by which the strainer 10 can be held and positioned, and each includes a through hole 26 by which the strainer can be secured to a stand if desired. The strainer 10 is provided with a filtering region 70 in the vicinity of the apex 18 that includes side filter areas 72 and an apex filter area 74.

In addition, the strainer 10 is provided with a dispensing tab 40 which protrudes from an exterior surface 29 of the strainer 10 along a line L extending between the apex 18 and the rim 16. The dispensing tab 40 permits the exterior of the strainer 10 to be manually grasped to facilitate removal from packaging or other storage means, while avoiding direct contact with conical body 14, and particularly avoiding contact with portions of the filtering region 70 including the filter areas 72, 74.

Figure 2:
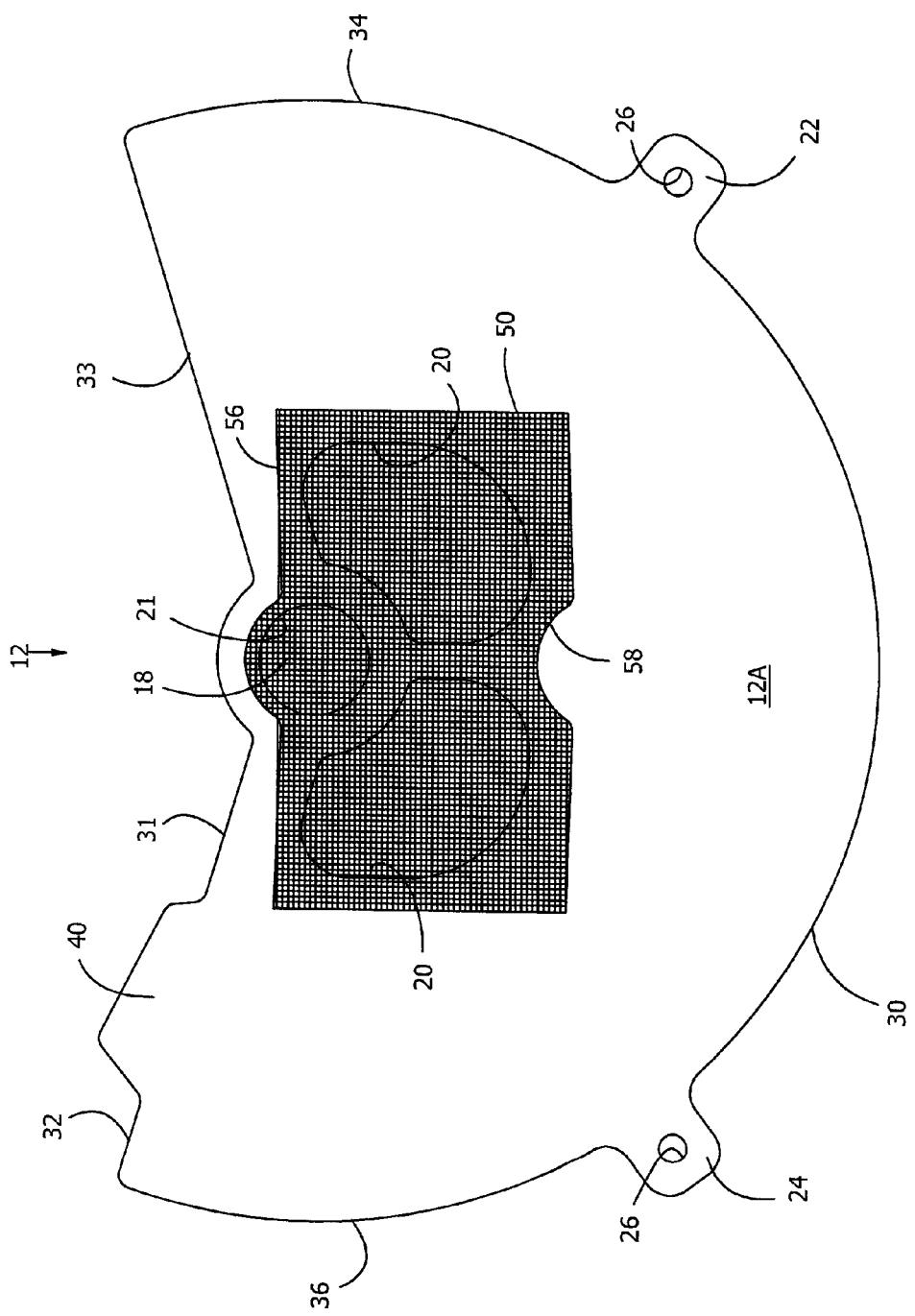
FIG. 2 is a top plan view of a blank used to form the strainer of FIG. 1.

Referring now to FIG. 2, the preferred embodiment of a blank for forming the disposable conical strainer 10 is illustrated generally at 12 and has a sheet body 12A with a first convex leading edge 30 and a second trailing substantially concave edge 31 extending between sides 34 and 36. When the blank 12 is formed into a cone, the convex edge 30 and sides 34, 36 together define the rim 16, and along with the concave edge 31 define the apex point 18 opposed to the rim 16. The sheet body 12A may further include the rim tab portions 22 and 24 formed at the respective intersections of sides 34, 36 and the convex edge 30.

The concave edge 31 is divided into two edge portions 32 and 33 which extend substantially from the apex 18 outwardly to the edge formed by sides 34 and 36. One of the edge portions 32 includes a protrusion which forms the dispensing tab 40. The dispensing tab 40 is integral with the sheet body 12A and protrudes from a generally central portion of the edge portion 32. More particularly, as better seen in FIG. 1, the dispensing tab 40 protrudes from the edge portion 32 at a location between the filtering region 70 and the rim 16. Although not limited to this location, placement of the dispensing tab 40 between the filtering region 70 and the rim 16 avoids likelihood of contact between a user's fingers and the filtering region. In the illustrated embodiment, the dispensing tab body is formed integrally with the sheet body 12A, but it is obvious to those skilled in the art that it may be a separately added member consisting of any material and be of any shape to perform the function of the invention. In the illustrated embodiment, the dispensing tab 40 is generally rectangular in shape, but the dispensing tab 40 is not limited to this shape.

Cutouts 20 are formed in the sheet body 12A near the concave edge 31, and are generally sector-shaped. The cutouts 20 define the side filter areas 72. In addition, a substantially circular opening 21, which is formed in the sheet body 12A so as to intersect the concave edge 31 at its midpoint, corresponds to the apex filter area 74. Through holes 26 are formed in the rim tab portions 22, 24.

The sheet body 12A material is preferably formed of a thin imperforate sheet material and can be for example kraft board, sulphate board, coated or non-coated paper or other materials resistant to paint or other liquids to be filtered.

A filter material strip 50 in the form of a mesh blank overlies the cutouts 20 and opening 21, and is glued to the body sheet material at marginal edge portions of the cutouts 20 and opening 21. The filter mesh material 50 can be any suitable screening material known in the art such as textile mesh of sufficient mesh size to filter the liquid material processed in any particular use. Perforated film, woven or non-woven fabrics of cotton, synthetic or metal fibers or yarns and other mesh materials can be used. The pore sizes of the mesh can vary according to the nature of the paint or liquid and the desired pore size can, for example, be in the range of 80 to 500 microns or can be formed of a suitable non-woven fabric such as a lightweight spunbonded polypropylene or polyester fabric.

Folding the sheet body 12 into the final conical strainer 10 is accomplished by positioning edge portion 32 over a margin portion of edge 33 and adhering the overlapped area 62, shown in cross-hatch in FIG. 1, from the apex 18 up to the upper edge, or rim, 16 of the conical strainer 10. Here, the edge portion 32 overlies the margin portion of edge 33 so as to reside on an exterior surface 29 of the strainer 10.

In addition, the dispensing tab 40, which protrudes from the edge portion 32, is not adhered to the margin portion of edge 33, and instead is free standing and foldable about the line L corresponding to the joint between the dispensing tab 40 and the edge portion 32. That is, the dispensing tab 40 includes a first broad side 42, a second broad side 44 opposed to the first side, and a peripheral edge 46 that joins the first and second sides 42, 44, such that the dispensing tab 40 is contiguous with the conical body 14 of the strainer 10 along a portion of the peripheral edge 46 that corresponds to the line L. Due to the flexibility of the sheet body material, the dispensing tab 40 is movable about the fold line between a first orientation in which the first side 42 of the dispensing tab 40 confronts and overlies the exterior surface 29 of the conical body 14, and a second orientation in which the second side 44 of the dispensing tab 40 confronts and overlies the exterior surface 29 of the conical body 14 (FIG. 1a). In use, the dispensing tab 40 is generally oriented so as to protrude from the exterior surface 29 and the first and second sides 42, 44 are substantially normal to the exterior surface 29.

Adhesion of the overlapped area 62 can be achieved using glues of the aqueous emulsion type. By maximizing the overlapped area 62, good adherence can be obtained. Moreover, the maximized area 62 further provides a somewhat rigidified doubled over portion which adds mechanical strength and forms a rib which aids in supporting the paint or other material strained.

In an embodiment of this invention, the strainer 10 has a diameter of approximately 6 inches at the rim 16, and the distance from the apex 18 to rim 16 is about five and one-quarter inches. The side cutout portions 20 define filter areas of 3 3/10 square inches each and the apex filter area 74 is generally conical with an area of 3/10 square inches and an overlapped, multi-ply area 64 of 1/10 square inch. Preferably the ratio of area 64 to the area of the conical apex filter mesh material is at least one to three. However, these dimensions are merely illustrative, and the invention is not limited thereto.

It should be understood that any number of cutout portions 20, 21 may be used as desired. An advantageous feature of the invention is the use of an apex filter 74 which enables maximized straining without wastage of material and with sufficient mechanical strength to enable straining under severe conditions of use as in paint straining and the like. Although the apex filter 74 is generally conical, the upper edge of the strainer 10 can be circular as in the preferred embodiment, star-shaped or have irregular shaped as may be desired for particular applications.

Figure 3:
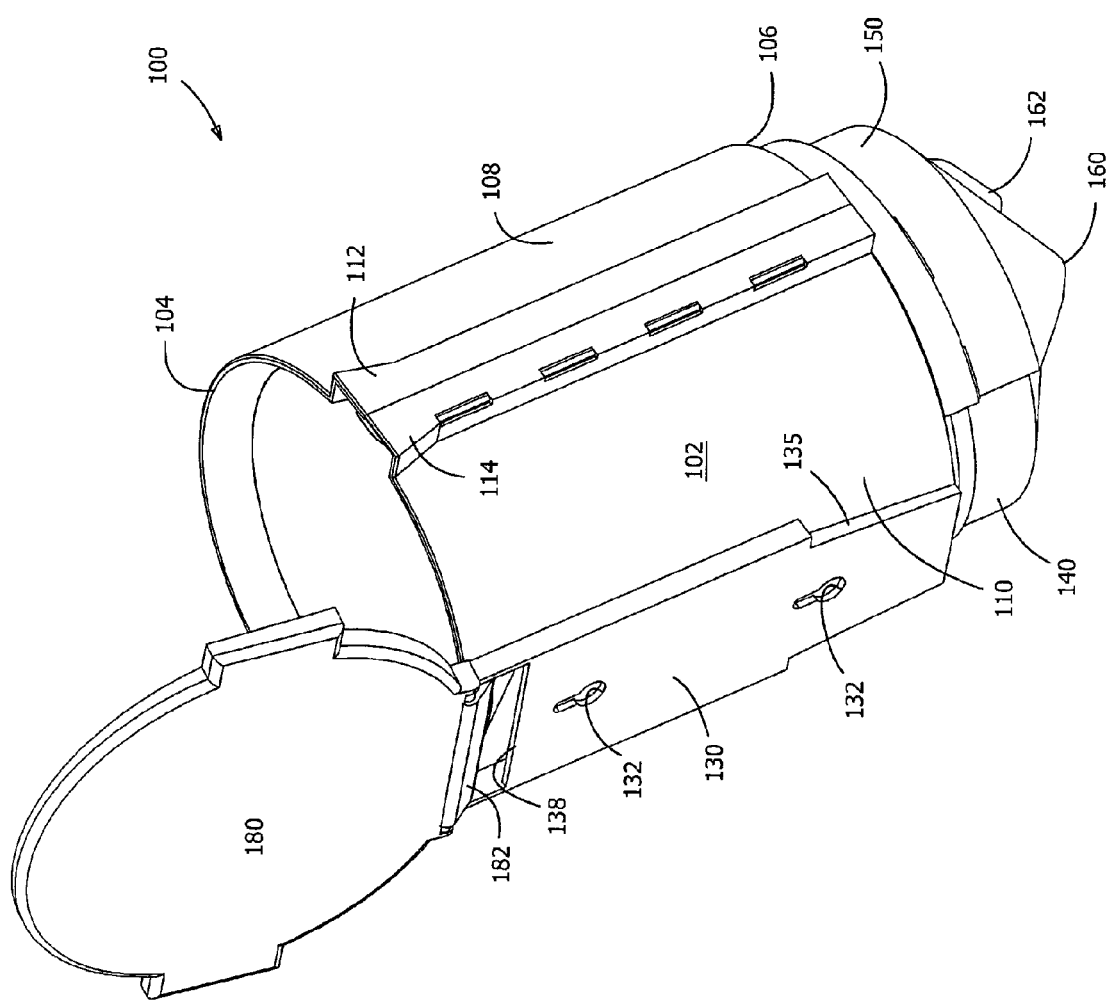
FIG. 3 is a rear perspective view of a strainer dispenser showing the skirt door in a closed position.
Figure 4:
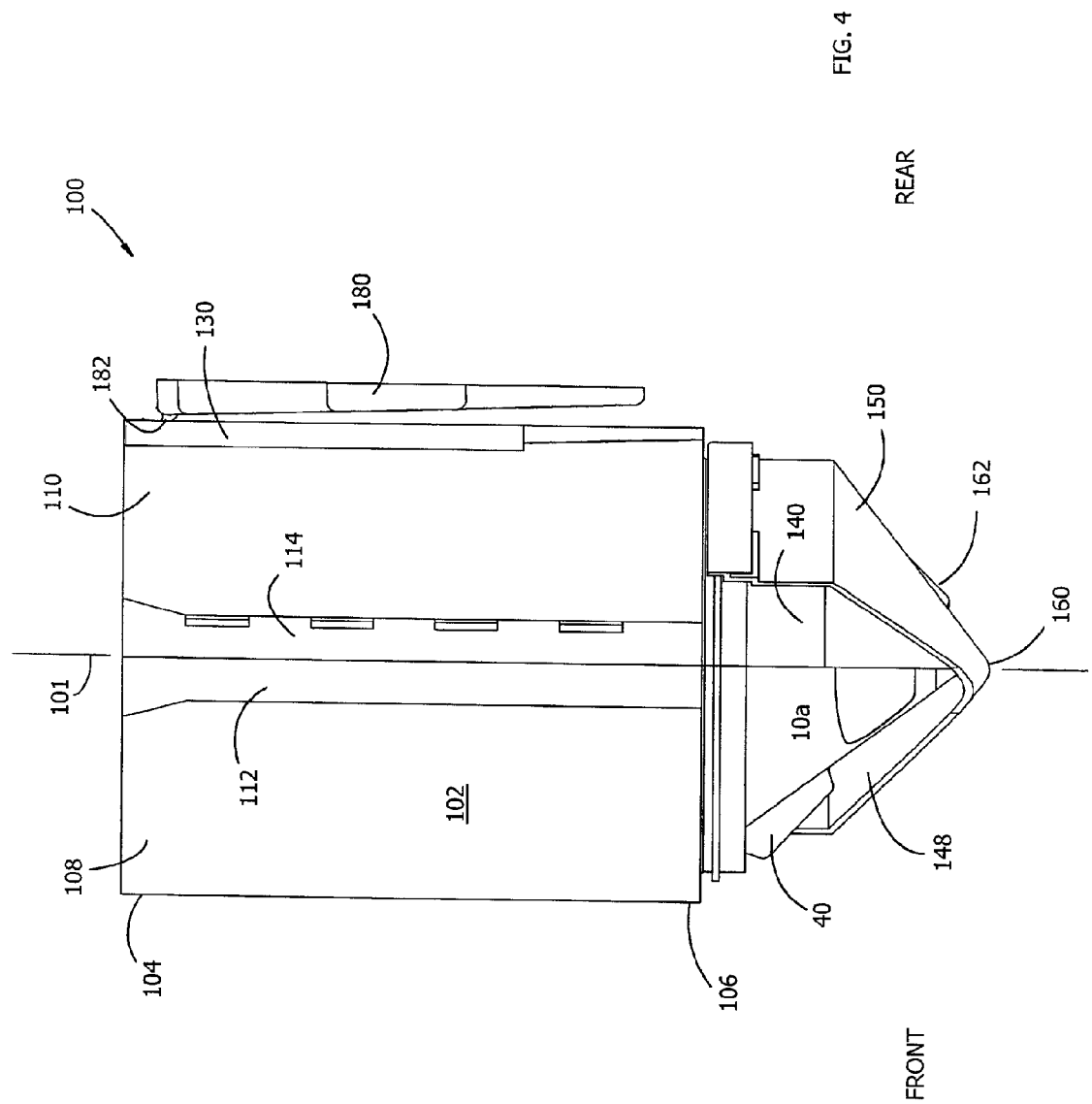
FIG. 4 is a side view of the dispenser of FIG. 3 showing the skirt door in an open position.

Referring now to FIGS. 3-13, a dispenser 100 is used to store multiple stacked, nested strainers 10, and to dispense individual strainers 10 from the lower end of the stack. With particular reference to FIGS. 3 and 4, the dispenser 100 includes an elongate hollow dispenser body 102 including opposed first and second ends 104, 106. In the illustrated embodiment, the dispenser body 102 is substantially cylindrical, and in use is generally oriented so that a longitudinal axis 101 of the body 102 is vertical and the first end 104 overlies the second end 106. The inner diameter of the dispenser body 102 is slightly greater than the outer diameter of the rim 16 of the strainer 10.

Figure 5:
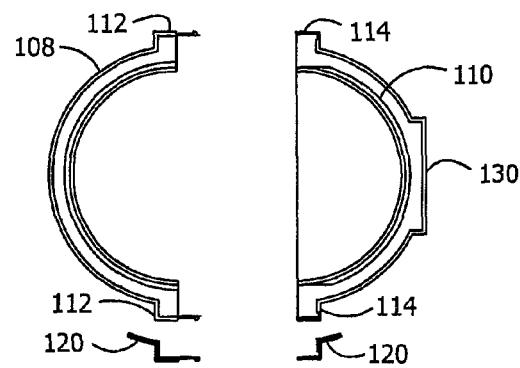
FIG. 5 is an exploded horizontal sectional view of the body of the dispenser of FIG. 3.
Figure 6:
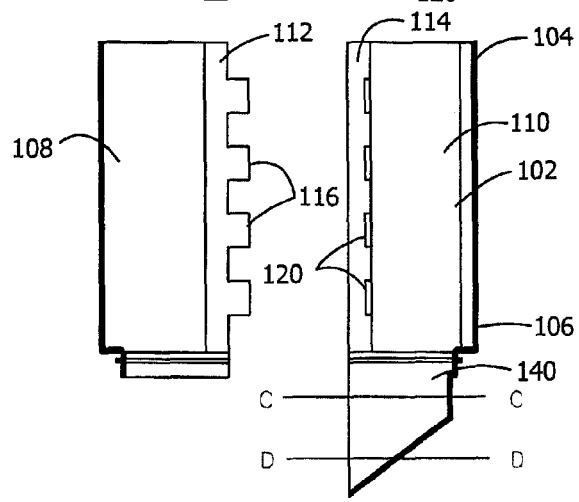
FIG. 6 is an exploded side view of the body of the dispenser of FIG. 5.

The dispenser body 102 is formed by joining two half cylinders (FIGS. 5-6). The first half cylinder corresponds to a front half 108 of the dispenser body 102, and the second half cylinder corresponds to the rear half 110 of the dispenser body 102. The half cylinders are joined along longitudinally extending edges which include radially outward extending flanges 112, 114. Specifically, the flanges 112 of the front half 108 are provided with one or more circumferentially extending connecting tabs 116. In addition, the flanges 114 of the rear half 110 are provided with corresponding connecting slots 118 dimensioned to receive the connecting tabs 116. When the two half cylinders are placed together so that the front half flanges 112 abut the rear half flanges 114, the connecting tabs 116 are received in corresponding connecting slots 118. The connecting tabs 116 may be press fit into the slots 118. In addition, fasteners such as clips 120 may be used to secure the respective the front and rear halves 108, 110 of the dispenser body 102 in a joined, cylindrical configuration.

In addition, the rear half 110 of the dispenser body 102 includes a flat, centrally disposed back panel 130 formed by providing body 102 with a stepped out portion. The flat back panel 130 provides a stable mounting surface that includes at least one through hole 132 to permit the dispenser 100 to be wall mounted. The through hole 132 may be elongated, and may include a widened portion sized to receive a fastener head therethrough.

Referring again to FIGS. 3 and 4, the first end 104 of the body 102 is open, and is provided with a removable cover 180 that closes the first end 104 and prevents dust and debris from entering the dispenser 100 through the first end 104. A rear edge of the cover 180 is pivotably connected to a rear edge of the first end 104. The pivotable connection is achieved by any conventional means, and may include providing a curved member 182 on the rear edge of the cover 180 which passes through and engages with slots 138 formed in the back panel 130 of the dispenser body 102.

Figure 7:
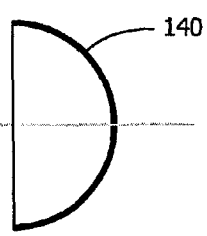
FIG. 7 is a cross sectional view across line C-C of FIG. 6.
Figure 8:
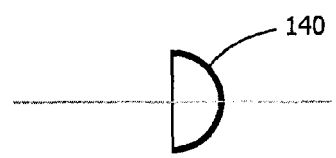
FIG. 8 is a cross sectional view across line D-D of FIG. 6.

The second end 106 of the body 102 is partially closed by a domed skirt 140 that extends axially from the second end 106, and which is semi-circular in cross-section (FIGS. 7 and 8). The skirt 140 is provided on a rear half of the dispenser body 102, such that the front half of the lower end of the dispenser is open. This opening is identified in the figures at 148.

Figure 9:
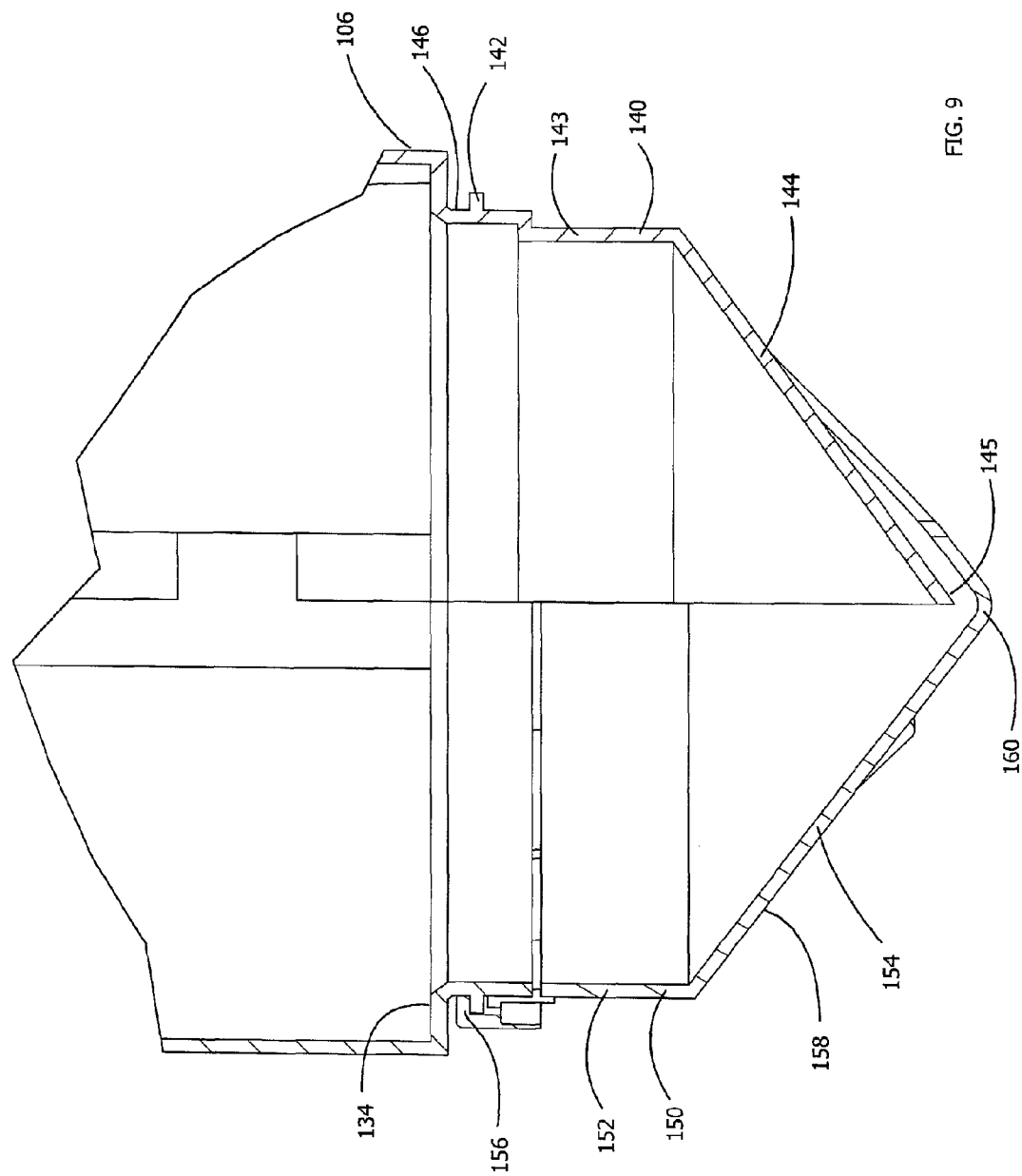
FIG. 9 is an enlarged side sectional view of the lower end of the dispenser of FIG. 3.
Figure 10A:
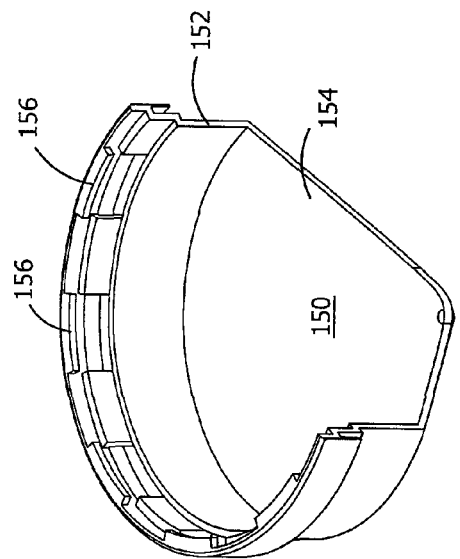
FIG. 10a is a perspective view of the isolated skirt of FIG. 10.

As best seen in FIG. 9, the skirt 140 includes a cylindrical portion 143 that extends integrally from the second end 106, and terminates in a tapered portion 144 that is tapered from the cylindrical portion 143 to a skirt apex 145. The cylindrical portion 143 includes a circumferential, outward protruding lip 142 disposed near the second end 106, forming a circumferential groove 146 between the second end 106 and the lip 142. The groove 146 is used to connect a rotatable skirt door 150 to the skirt 140, as discussed further below.

Figure 10:
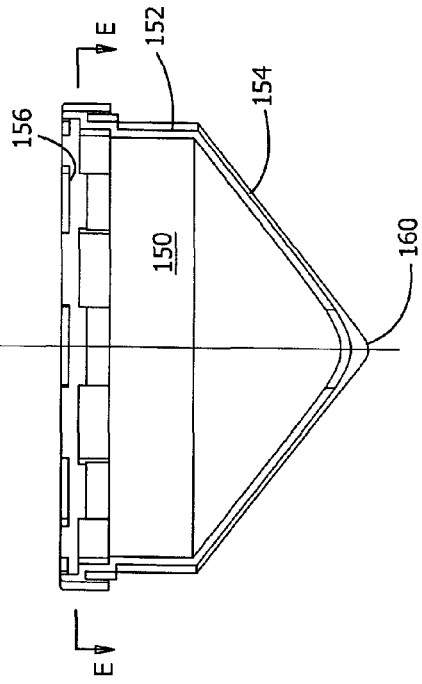
FIG. 10 is a side sectional view of the skirt isolated from the dispenser.

The domed skirt door 150, having a shape that substantially conforms to that of the skirt 140, overlies and surrounds at least a portion of the skirt 140. The skirt door 150 is sector shaped in cross section such that the arc angle θ of the sector is greater than 180 degrees (FIG. 10). The sector arc angle θ is required to be at least slightly greater than 180 degrees so that when the skirt door 150 is in a closed position relative to the skirt 140, the skirt door 150 completely closes the opening 148 at the front half of the lower end 106 of the dispenser 100, as so that the sides edges of the skirt door 150 overlie opposed sides of the skirt 140 (FIG. 3). In the illustrated embodiment, the sector arc angle θ is approximately 210 degrees, but the sector arc angle θ may be in the range of 182 to 300 degrees. This sector arc angle θ is sufficient to permit selective opening and complete closure of the front opening 148, while also permitting withdrawal of a strainer 10 through the opening 148.

Figure 11:
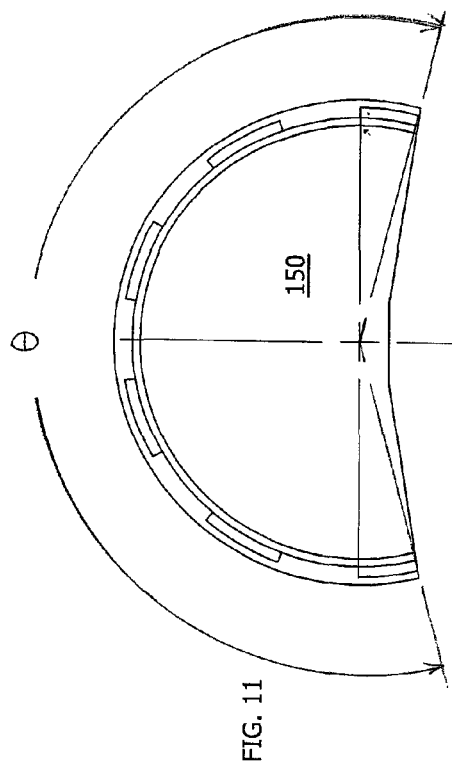
FIG. 11 is a cross sectional view across line E-E of FIG. 10.

Referring to FIGS. 9 and 11, the skirt door 150 includes a skirt door apex 160 that surrounds the skirt apex 145 such that the skirt apex 145 is nested within the skirt door apex 160. The skirt door 150 includes a cylindrical portion 152 disposed adjacent to the second end 106, and a tapered portion 154 that is tapered from the cylindrical portion 152 to the skirt door apex 160. The cylindrical portion 152 includes a circumferential, inward protruding lip 156 disposed near the second end 106. The skirt door lip 156 is received within and engages the groove to retain the skirt door 150 on the skirt 140. The lip 156 is sized and shaped to permit the skirt door 150 to slide over the outer surface of the skirt 140 while rotating about the longitudinal axis 101 of the dispenser body 102 between an open position (FIG. 4) and a closed position (FIG. 3).

In the open position, the skirt door 150 is rotated to a position substantially on the rear of the dispenser 100 so that opening 148 on the lower end 106 of the front of the dispenser 100 is open, and the skirt door 150 completely surrounds the entire skirt 140.

In the closed position, the skirt door 150 is rotated to a position substantially on the front of the dispenser 100 so that the opening 148 is closed, and only the margin portions of the edges of the skirt door 150 overlie laterally opposed sides of the skirt 140. In the closed position, the skirt door 150, in combination with the skirt 140, closes the opening 148 at the second end 106 and prevents dust and debris from entering the dispenser 100 through the opening 148. In some embodiments, the skirt door 150 may be transparent, whereby it is possible to view the strainers 10 loaded in the dispenser 10 through the skirt door 150, even when the skirt door 150 is in a closed position.

The diameter of the respective cylindrical portions 143, 152 of the dispenser 100 is less than that of the second end 106 of the cylinder body 102, and is slightly less than the diameter of the rim of the strainer 11. As a result, a shoulder 134 is formed on the inner surface of the dispenser 100.

In addition, a handle 162 is formed on the outer surface 158 of the tapered portion 154 of the skirt door 150. The handle 162 is a thin plate that protrudes radially outward from the outer surface 158, and extends along a line between the skirt door apex 160 and cylindrical portion 152. The handle 162 can be easily manually grasped and used to rotate the skirt door 150 relative to the skirt 140 about the longitudinal axis 101 of the dispenser 100.

Figure 12:
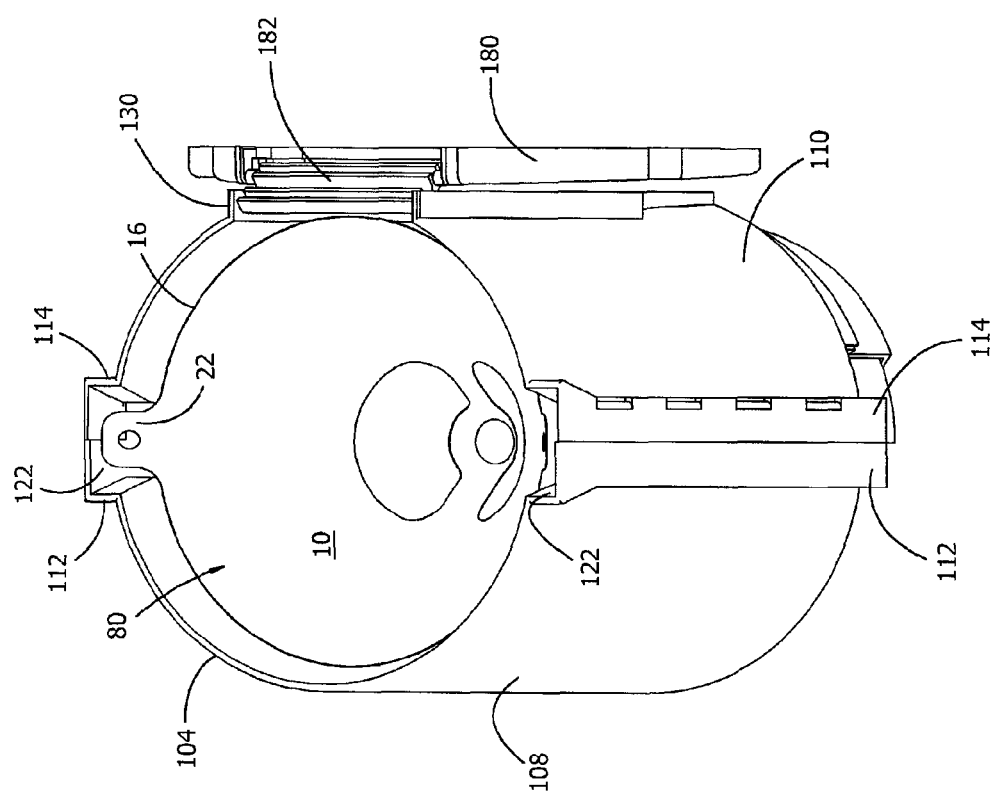
FIG. 12 is a top view of the dispenser with a stack of strainers positioned within the interior space.

Referring to FIG. 12, a stack 80 of nested strainers 10 are shown disposed in the dispenser 100. The stack 80 is loaded into the dispenser 100 through the open first end 104 with the strainers 10 in an upright orientation such that the apices 18 of the strainers 10 are downward, and the respective rims 16 reside above the apices 18. When the strainers 10 are loaded into the dispenser 100, the lower-most strainer 10 is supported on the shoulder 134 so that rim 16 and portions of the conical body adjacent the rim 16 are disposed within the cylinder body 102 of the dispenser. Correspondingly, the remainder of the strainer 10, and particularly the filtering portion 70, extends below the cylindrical body 102 and resides within the skirt 140. In this configuration, when the skirt door 150 is in the open position, the forward facing side of the lower portion of the strainer 10 is exposed to the exterior (FIG. 4).

The rim tabs 22, 24 of the strainer 10, having an outer dimension greater than the diameter of the rim 16 and of the cylinder body 102, are received within the interior channel 122 formed by the joined front and rear flanges 112, 114. As a result, the strainer 10, when disposed within the dispenser 100, is constrained to a particular orientation relative to its longitudinal axis 11. That is, when the rim tabs 22, 24 are received within the channels 122, the dispensing tab 40 can be oriented to face the opening of the skirt 140. Thus, the dispenser 100 is configured to dispense strainers 10 in a predetermined orientation relative to the longitudinal axis 11 of the strainer 10. In addition, since the dispenser 100 maintains the strainer in an upright orientation with the apex 18 disposed below the rim 16, the strainer is also constrained to a predetermined orientation about an axis transverse to the longitudinal axis 11.

The dispenser 100 permits storage of one or more strainers 10, and when storing the strainers, the dispenser can be fully closed so that the strainers 10 are protected from environmental dust and debris. In addition, the dispenser 100 includes a closable door 150 that can be selectively opened and closed to permit access to the opening 148 formed in the lower end 106, through which individual strainers 10 can be dispensed.

Figure 16:
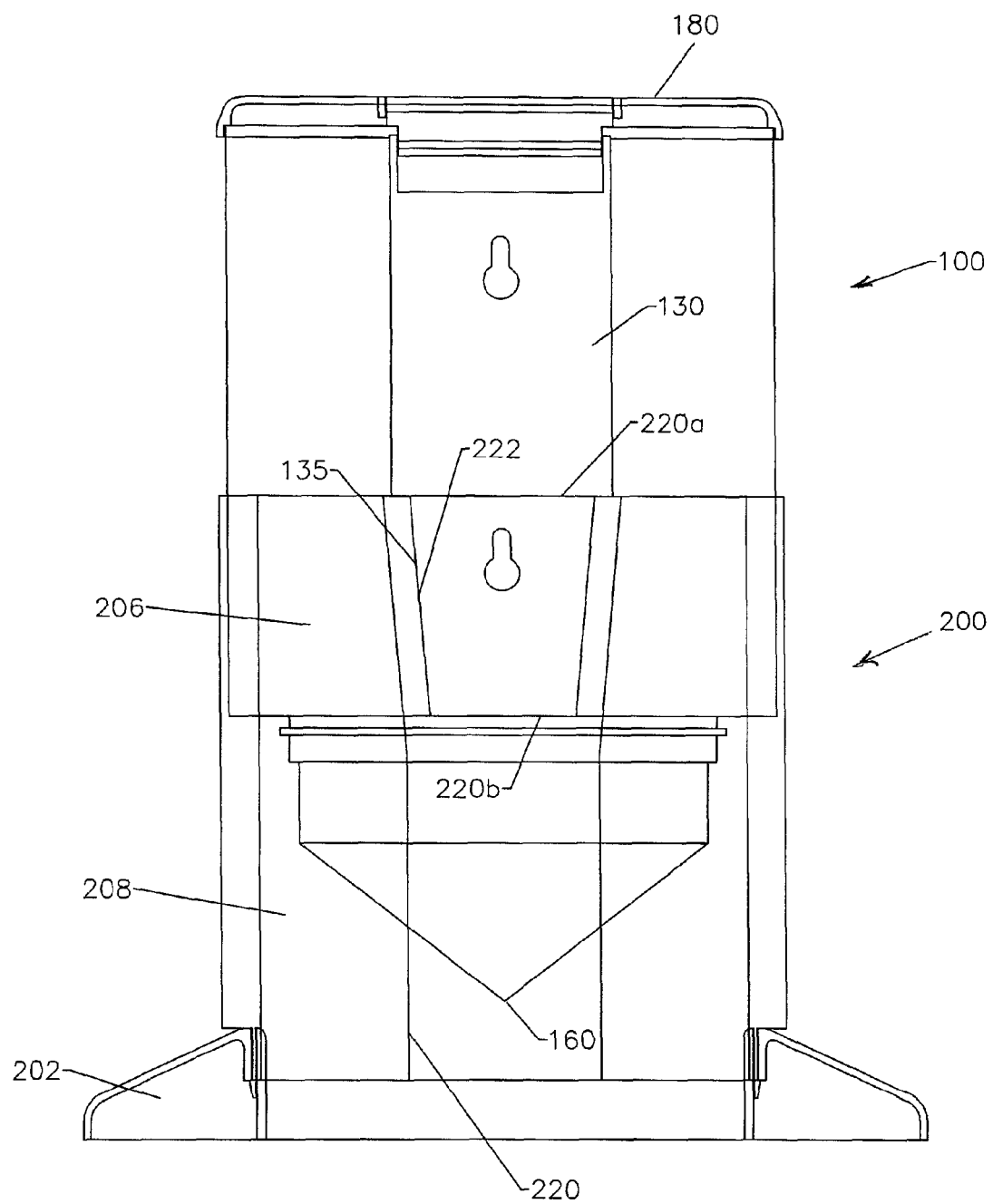
FIG. 16 is a rear view of the dispenser supported in the stand of FIG. 13.

Referring to FIG. 13, in addition to having features which permit it to be wall mounted, the dispenser 100 may also include a stand 200, which allows the dispenser 100 to be supported in an upright orientation relative to a horizontal mounting surface such as a counter top. The stand 200 includes a base 202 and a sleeve 204 which extends upward from the base 202. The base 202 is generally U-shaped, and is oriented to open to a side corresponding to the front of the dispenser 100. The sleeve 204 includes an extension portion 208 extending upward from the base 202, and an annular portion 206 mounted to the top of the extension portion 208. The annular portion 206 is closed in cross section so as to form a ring in which the dispenser 100 is received and supported (FIG. 16). In addition, like the base 202, the extension portion 208 is a plate member formed into a U-shape that opens to the front.

As seen in FIGS. 14 and 15, the sleeve 204 is formed having a peripheral shape that conforms to the shape of the dispenser body 102, and includes opposed sleeve side channels 218 which are sized and shaped to receive the flanges 112, 114 of the dispenser body 102 therein. A sleeve rear channel 220 is provided on a rearward side of the sleeve 204 which is sized and shaped to accommodate the back panel 130 of the dispenser body 102. The sleeve rear channel 220 is provided with a slightly circumferentially inward taper 222 so that the upper end 220a of the sleeve rear channel 220 is wider than the lower end 220b. The taper 222 is dimensioned to match a corresponding taper 135 formed on the back panel 130 of the dispenser body 102.

In use the dispenser 100 is received within the sleeve 204 so that a front of the dispenser 100 faces forward, and the annular portion 206 surrounds the lower end of the dispenser 100. In addition, the flanges 112, 114 of the dispenser 100 are received in the sleeve side channels 218, and the back panel 130 is received in the sleeve rear channel 220. The respective tapered surfaces 135, 222 of the dispenser 100 and annular portion 206 engage, whereby the dispenser 100 is maintained within the stand 200 at a predetermined height above the horizontal mounting surface.

A method of using the dispenser 100 to store a stack of conical strainers 10, and to dispense individual strainers 10 from the dispenser 100, will now be described. The method includes the following steps:

Step 1. Loading stacked and nested conical strainers 10 into the interior of the cylindrical body 102 by inserting the stack 80 into the cylindrical body 102 such that the apex 18 of a leading (lower-most) strainer 10 is first in. The loaded strainers 10 are positioned in the dispenser such that at least the apex 18 of the leading strainer 10 extends beyond a second end 106 of the cylindrical body, and is at least partially surrounded by the skirt 140 and skirt door 150. In addition, the loaded strainers are positioned in the dispenser such that the rim tabs 22, 24 reside within the channels 122, and the dispensing tab 40 is disposed in the opening 148. This orientation of the strainer 10 within the dispenser 100 conveniently makes the dispensing tab 40 easily accessible when the skirt door 150 is rotated to an open position. Although the strainer 10 can be inserted into the dispenser 100 in other orientations, for example in an orientation in which the rim tabs 22, 24 do not reside within the channels 122, placement of the rim tabs 22, 24 within the channels 122 advantageously promotes centering of the dispensing tab 40 in the opening 148.

During storage of the strainers 10, the cover 180 for the upper end of the dispenser and the skirt door 150 are closed, providing a closed storage device and preventing dust and debris from contacting and contaminating the strainers 10.

Step 2. Open the skirt door 150 from the closed position (FIG. 3) to the open position (FIG. 4) to provide access to the leading strainer. Of course, this step can be skipped in the event that the skirt door 150 was already in an open position.

Step 3. Dispensing the leading strainer 10 separately from the remaining stacked strainers 10. This is achieved by:

Step 3a. Manually grasping the dispensing tab 40 that is located on the outer side surface of the leading strainer 10a, and then Step 3b. Using the dispensing tab 40 to pull downward on the strainer 10 while rotating the apex 18 radially outward, withdrawing the leading strainer 10 from the dispenser.

Because the dispensing tab 40 is on the exterior surface 28 of the strainer 10, the dispensing tab 40 can be grasped and the strainer dispensed with a lateral motion, allowing on the strainer 10 to come free of the stack and be dispensed.

Because the dispensing tab 40 is on the exterior surface 28 of the strainer 10, there is no need to contact the conical surface 14 of the strainer 10, and any contact with the filter region 70 can be avoided.

Use of the dispensing tab 40 to grasp the strainer 10 allows only one strainer to be dispensed at a time, and protects the filter portion 70 of the strainer. In contrast, if the strainer were to be dispensed without the dispensing tab 40, grasping the conical body 14 by pinching of the tip or mesh could damage or contaminate the filter portion 70. In addition, it is difficult to grasp the conical body directly while controlling the pinching tension, and pinching often results in more than the one strainer 10 being dispensed.

Step 4. Close the skirt door 150 to ensure that the remaining strainers 10 are stored and maintained in a non-contaminated condition.

Although the dispenser 100 is configured to accommodate the features of strainer 10, it is understood that other strainer configurations including strainers having no rim tabs 22, 24 can be stored in, and dispensed using, the dispenser 100.

Figure 17:
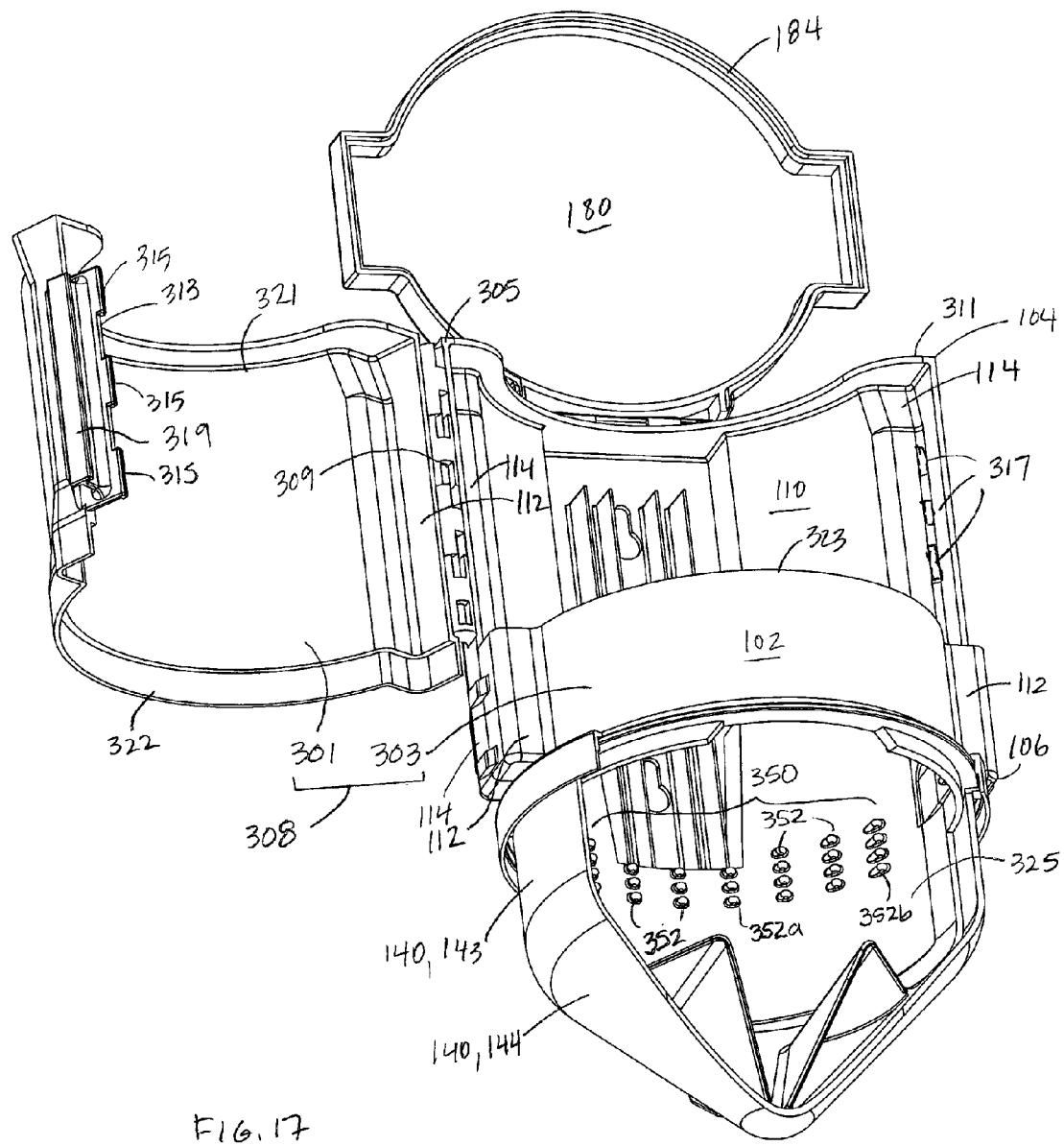
FIG. 17 is a front perspective view of an alternative embodiment strainer dispenser.

Referring now to FIG. 17, an alternative embodiment dispenser 300 is also used to store multiple, stacked, nested strainers 10. The dispenser 300 is substantially similar to the embodiment 100 described above, and therefore structures common to both dispensers 100, 300 will be referred to using the same reference numbers, and descriptions of common structures will be omitted. The dispenser 300 differs from the earlier embodiment in that it includes a dispenser body 102 that is oval rather than circular in cross-sectional shape. The degree of non-circularity of the cross section is relatively small in that the distance from front to rear of the dispenser 300 is slightly less than that of the distance from left side flanges 112, 114 to right side flanges 112, 114, but is sufficient to slightly compress the stack of strainers 80 so that the rims 16 of the respective strainers 10 are slightly ovaled when stored within the dispenser 300.

The dispenser 300 also differs from the earlier embodiment 100 in that it includes a modified front half 308. In the dispenser 300, the half cylinder which forms the front half 308 of the dispenser body 102 is provided in two separable parts. In particular, the front half 308 includes an upper portion 301 and a lower portion 303. The lower portion 303 is disposed at the second end 106 of the dispenser body 102, and is joined to the rear half 110 of the dispenser body 102 along respective flanges 112, 114 as described in the earlier embodiment.

The upper portion 301 is pivotably joined to the rear half 110 along the flanges 112, 114 at one lateral side 305 of the dispenser 300 so as to serve as a front-opening door within the dispenser body 102. For example, a hinge 309 is used to join the upper portion 301 to the rear half 110 which permits the upper portion 301 to pivot about an axis parallel to the longitudinal axis 101 of the dispenser 300. As seen in the figure, the upper portion 301 can be pivoted to one side of the dispenser 300, creating a large front opening in the dispenser 300 to facilitate loading of a stack 80 of strainers 10 into the dispense 300. In addition, when in a closed position, the upper portion 301 can be selectively connected to the rear half 110. For example, a longitudinally-extending edge 313 of the upper portion 301 is provided with protrusions 315 that are received in corresponding recesses 317 formed in the corresponding flange 114 at the other lateral side 311 of the dispenser 300. In addition, a handle 319 is provided along the edge 313 to allow the upper portion 301 to be easily moved between open and closed positions. After a stack 80 has been loaded into the dispenser 300, the upper portion 301 can be closed and retained in the closed position by snapping the protrusions 315 into the corresponding recesses 317.

The lid 180 of the dispenser 300 includes a peripheral edge 184 which, when the lid 180 is in a closed position, overlies the upper edge 321 of the upper portion 301 to prevent the upper portion 301 from being unintentionally opened. In addition, the upper portion 301 is sized so that the lower edge 322 of the upper portion 301 overlaps the upper edge 323 of the lower portion 303. This overlap is provided to minimize the possibility that contaminants can enter the interior of the dispenser 301 through the front of device, when the upper portion 301 is in the closed position.

Figure 18:
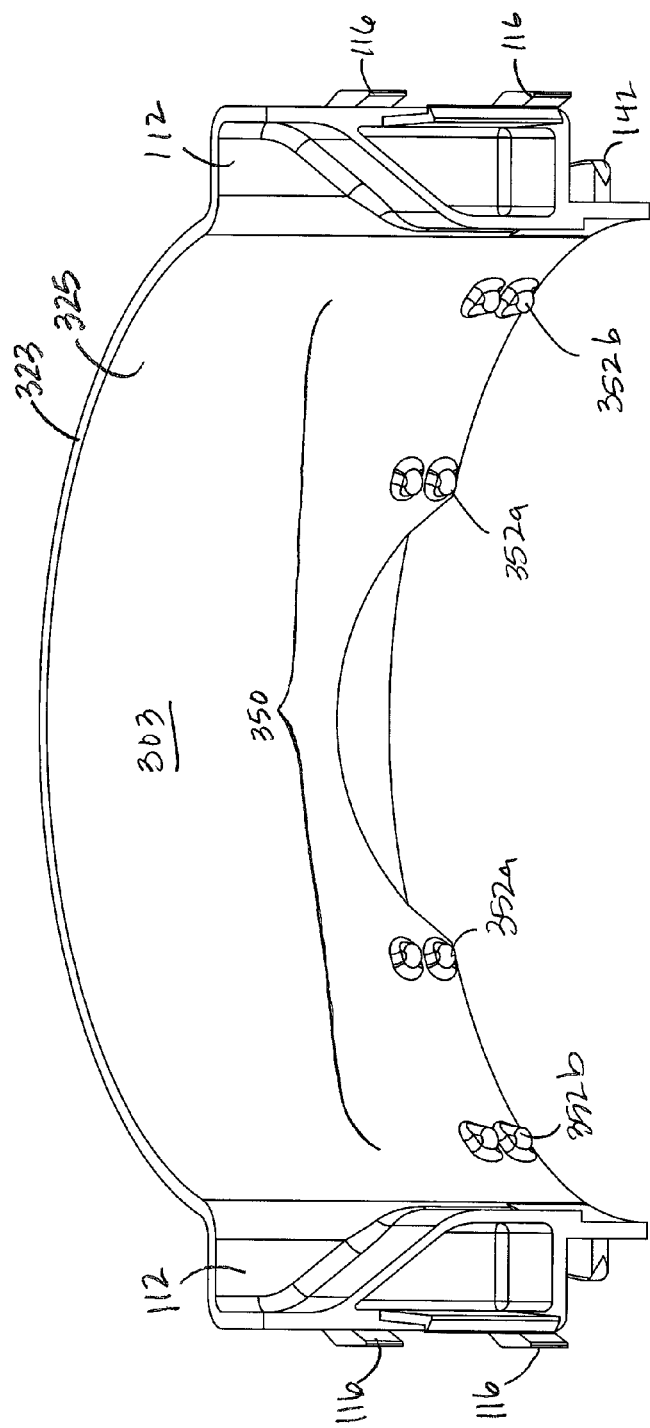
FIG. 18 is a perspective view of the inside surface of the lower portion of the front half of the strainer dispenser of FIG. 17.

Referring now also to FIG. 18, in the dispenser 300, the diameter of the respective cylindrical portions 143, 153 of the skirt 140 and skirt door 150 is substantially the same as that of the second end 106 of the body 102, whereby no shoulder is formed between the second end 106 of the body 102 and the skirt 140. To provide support for the strainers 10 to be disposed within the dispenser 300, an inner surface of the dispenser 300 includes an array 350 of individual, spaced-apart studs 352. The array 350 is located in a region between a midpoint and second end 106 of the dispenser. In particular, the array 350 is located adjacent to the second end 106 of the dispenser body 102, above and adjoining the skirt 140. Within the array 350, the studs 352 are arranged both in columns aligned with the longitudinal axis 101 of the dispenser 300 and in rows extending about a circumference of the dispenser 300.

The studs 352 protrude generally radially inward from an inner surface 325 of the dispenser 300. Each stud 352 in the array 350 has approximately the same radial depth, and may be asymmetrically shaped. In addition, each individual stud 352 has a shape that is different from some of the other studs 352. For example, all studs 352 within a column have the same shape, but have a different shape from studs 352 in the other columns. In other words, each stud 352 within a row has a shape that is unique relative to other studs 352 in the same row. For example, when viewed in profile along an axial direction of the dispenser 300, the studs 352a in a centrally located column may have a semicircular shape, while the studs 352b in a laterally located column may have a teardrop shape.

The array 350 extends about the entire circumference of the dispenser body 102, and thus is provided on both the rear half 110, and on the lower portion 303 of the front half 308. On the rear half 110, the array 350 has four rows of studs 352. However, on the front half 308, the array 350 includes two rows of studs 352 that are circumferentially aligned with the lower two rows of the rear half 110. As a result, the studs 352 are arranged in such a way so as to impart a tilt to the stack 80 of strainers 10. In particular, due to interference with the studs 352, the rim 16 of the strainer 10 is allowed to drop to a lower position along the front half 308 than along the rear half 110, making it easier for the strainer to be dispensed from the dispenser 300. Of course, with the studs arranged at the same vertical height within the dispenser, a tilt may also be imparted to the stack of strainers by producing the strainer so that rim 16 is lower on one section of the conical strainer than the opposite section. In addition, the effect of providing vertically spaced rows of studs 352 is to lift and ruffle the strainers 10 within the stack 80, and thus to separate the strainers 10 from each other, which also facilitates dispensation.

Contrary to what might be expected, it has been found that the use of individual, spaced, non-linear studs 352, rather than a continuous circumferentially-extending annular flange, ring, groove or thread, facilitates dispensing of one strainer 10 at a time and increases the window of variation in the diameter of the strainer that can be dispensed. It has also been found that having a differential number of studs 352 on respective front and rear halves 308, 110 of the dispenser 300 facilitates the dispensing of the strainers 10 in an individual manner. It appears that because these individual, spaced studs 352 reduce the area of surface contact between the strainer 10 and the inner surface 325 of the dispenser 300, the rim 16 of the strainer 10 can more easily flex around the studs 352, then return to its original diameter, the rim 16 nesting within the studs 352. While the number of rows of studs 352 employed can vary from a single row to complete coverage of the dispenser walls, at least one row on one half of the dispenser and at least two rows on the other half of the dispenser.

Figure 19:
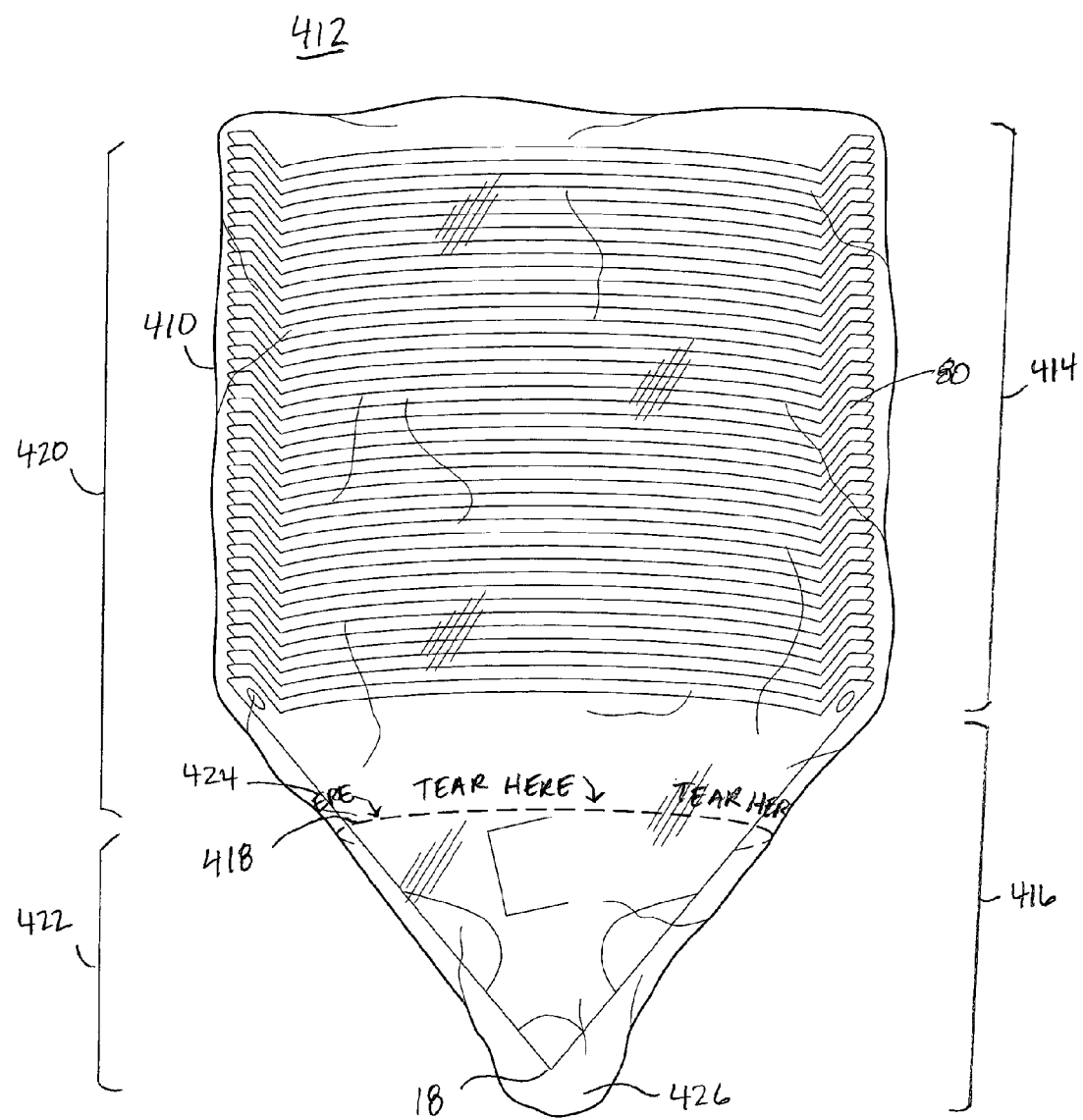
FIG. 19 is a front view of a pod.

Referring to FIG. 19, a stack 80 of strainers 10 is enclosed in a protective material 410, creating a pod 412. The protective material 410 is a thin, plastic film used to prevent contamination of the strainers 10 enclosed therein from airborne pollutants, particulates and moisture and/from direct contaminant transfer during stack handling. In the illustrated embodiment, the protective material 410 is in the form of a tube that generally conforms to the shape of the stack 80, and thus includes a cylindrical portion 414 at the upper end of the pod 412, and a conical portion 416 at the lower end of the pod 412. The protective material 410 surrounds the sides, top and bottom of the stack 80, and both the top and the bottom of the tube are sealed for example by heat or ultrasound in order to provide contaminant-free storage.

The protective material 410 is perforated in such a manner that enables the protective material 410 separable into individual portions. This, in turn, enables the protective material 410 to be opened and removed from the stack 80 of strainers 10 after the stack 80 has been placed within the dispenser 300. In particular, the protective material 410 includes a perforation line 418 that extends about the circumference of the pod 412 and is located adjacent an end of the pod 412. In the illustrated embodiment, for example, the perforation line 418 is located within the conical portion 416, permitting the protective material to be separated along the perforation into two individual, separate portions 420, 422.

To aid the user in quickly identifying the location of the perforation, the protective material 410 is imprinted with indicia 424 which overlies the perforation line 418 and indicates its location. The indicia may include instructive wording and/or a facsimile of the perforations, on top of or next to the actual perforation line 418, in order to facilitate placement of the pod 412 within the dispenser 300. The indicia can also include printed instructions as to how to remove the protective material 410 once the perforation is broken.

In addition, the protective material 410 extends beyond the apex 18 of the lower-most (outermost) strainer 10 of the stack 80 to provide a gripping area 426 that may be used to remove part of the protective material 410. In use, the user grasps the gripping area 426 and pulls away from the stack 80, creating a tear along the perforation line 418. If pulled sufficiently, the protective material into two individual portions, an upper material portion 420 corresponding generally to the cylindrical portion 414, and a lower material portion 422 corresponding generally to the conical portion 416.

By enclosing the stack 80 within the protective material 410, the pod 412 of wrapped strainers 10 can be placed within the dispenser 300 without exposure of the strainer 10 itself or the filter mesh 50 to ambient particulates in the air and without the risk of contamination from body oils or substances on the hand of the user. Ideally, the strainers 10 have been manufactured by automated means to avoid touching of the filter mesh during production, and the stack 80 of strainers 10 is packaged by automated means to avoid handling of the completed strainer 10 and touching of the filter mesh 50. Automated production also minimizes the "open" time of the filter mesh in ambient air, reducing the time of exposure to particulates in the environment and lends itself to in-line cleaning and de-contamination of the strainer from any particulates that may have accumulated on the strainer mesh 50 or blank 12 during manufacturing. Nevertheless, the use of the protective material 410 to allow contamination-free placement within the dispenser 300 is, in itself, of significant benefit.

The protective material is not limited to the configuration described above. For example, the ends of the tube of protective material may be sealed using tape or a tie. In another example, the protective material 410 may extend beyond the top of the stack 80 of strainers 10 and be left unsealed, but tucked down into the concave opening of the upper-most (innermost) conical strainer 10 of the stack 80 to prevent dust from collecting inside the strainer body 14. The protective material 410 may also extend beyond the apex 18 of the lower-most (outermost) strainer 10 of the stack 80, and be tucked up over the sides of the stack 80 to prevent dust from entering the pod from the bottom. In still another example, the perforation 418 can be replaced with an opening string which, when pulled, results in separation of the portions of the protective material 410.

A method of loading the dispenser 300 with a stack of conical strainers 10 while minimizing strainer 10 contamination will now be described. The method includes the following steps:

Step 1. Providing a pod 412 which includes a stack 80 of strainers 10 that is enclosed in protective material 410 (FIG. 19). Because the user handles the pod 412, rather than strainers 10 themselves, contamination of the strainers 10 during handling and dispenser loading is minimized.

Step 2. Opening the dispenser 300. This may include one or more of opening the lid 180 and the upper portion 301 of the front half 308 of the dispenser body 102 (FIG. 17) to permit insertion of the pod 412, and opening the skirt door 150 from the closed position (FIG. 3) to the open position (FIG. 4) to provide access to the lower-most (leading) strainer 10 once the pod 412 has been inserted. Of course, this step can be skipped in the event that the skirt door 150 was already in an open position.

Figure 20:
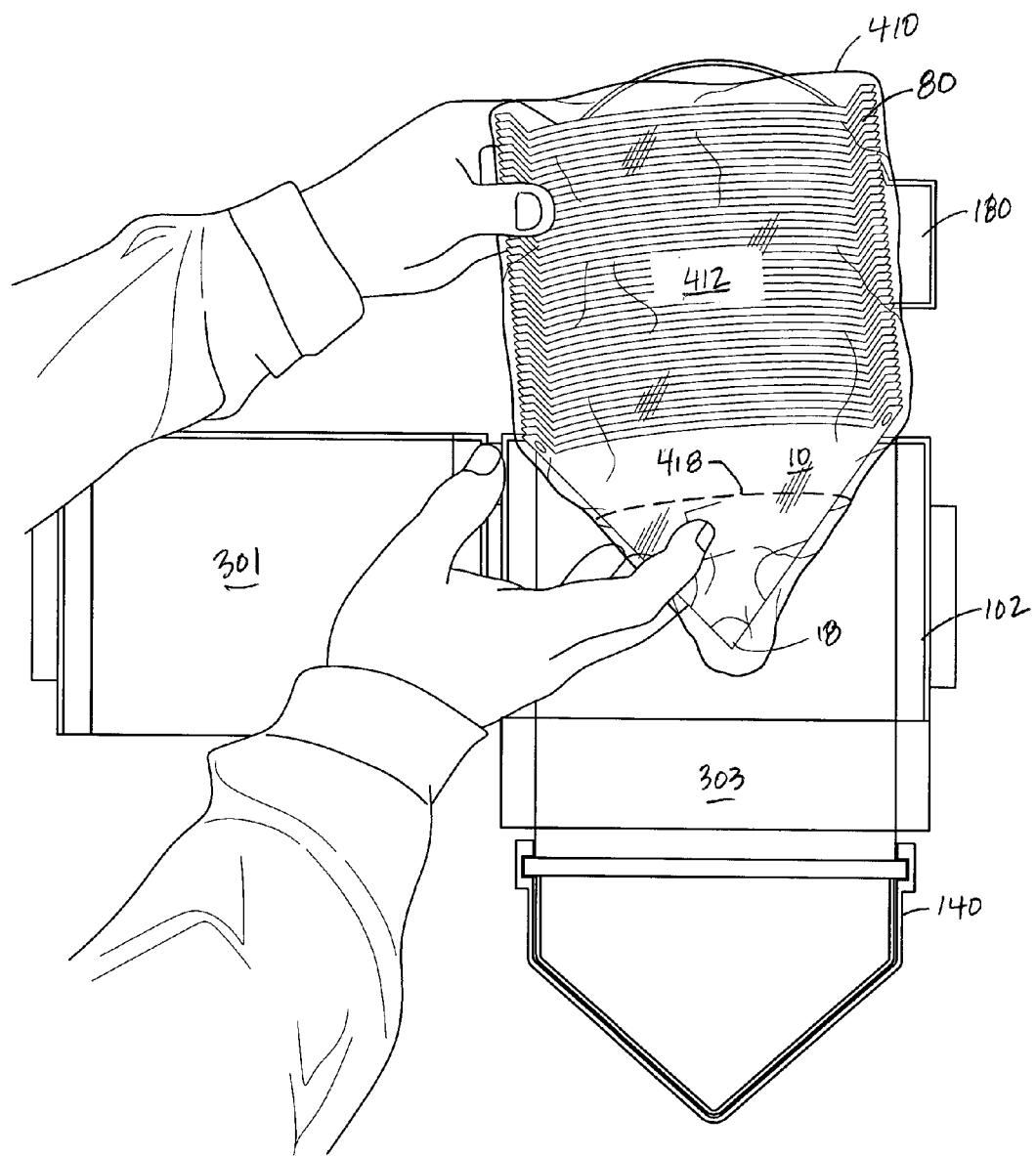
FIG. 20 illustrates insertion of the pod of FIG. 19 into the dispenser of FIG. 17.
Figure 21:
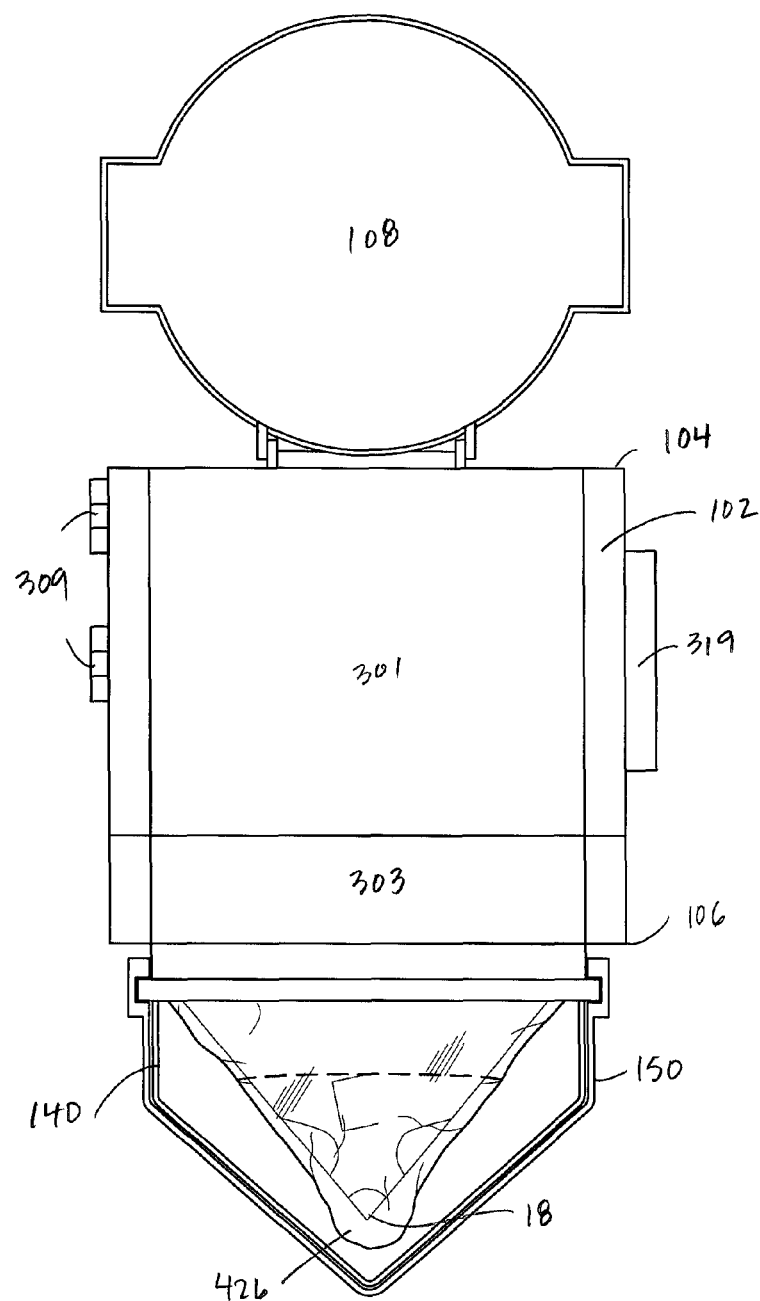
FIG. 21 is a front view of the dispenser of FIG. 17 with a pod loaded therein.

Step 3. Loading the pod 412 into the interior of the cylindrical body 102 by inserting the stack 80 into open first end 104 of the dispenser body 102 such that the apex 18 of the lower-most strainer 10 is first in (FIG. 20). Once loaded, the upper portion 301 of the front half 308 of the dispenser body 102 is moved to the closed position (FIG. 21), and the pod 412 including the stack 80 is positioned in the dispenser 300 such that at least the apex 18 of the leading strainer extends beyond a second end 106 of the dispenser body 102, and is at least partially surrounded by the skirt 140 and skirt door 150. In addition, the loaded strainers 10 are positioned in the dispenser such that the rim tabs 22, 24 reside within the channels 122, and the dispensing tab 40 is disposed in the opening 148. This orientation of the strainer 10 within the dispenser 100 conveniently makes the dispensing tab 40 easily accessible when the skirt door 150 is rotated to an open position. Although the strainer 10 can be inserted into the dispenser 100 in other orientations, for example in an orientation in which the rim tabs 22, 24 do not reside within the channels 122, placement of the rim tabs 22, 24 within the channels 122 advantageously promotes centering of the dispensing tab 40 in the opening 148.

During storage of the strainers 10, the cover 180 for the upper end of the dispenser and the skirt door 150 are closed, providing a closed storage device and preventing dust and debris from contacting and contaminating the strainers 10.

Figure 22:
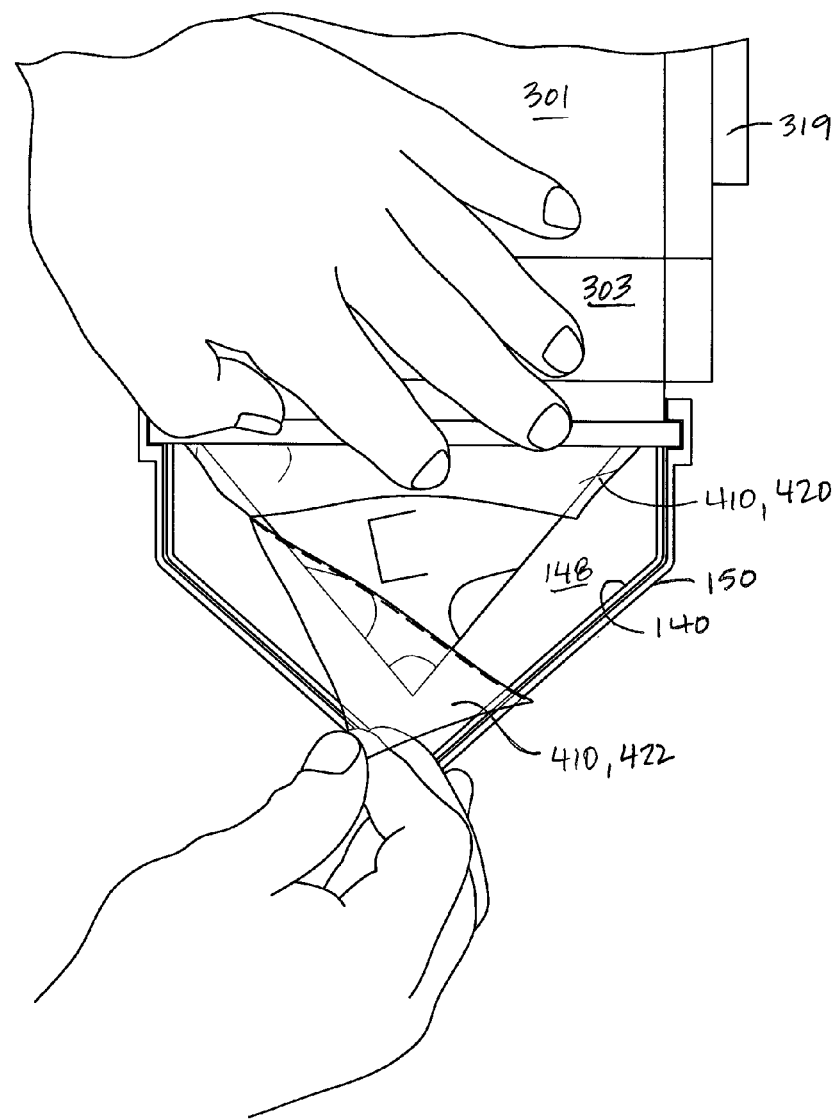
FIG. 22 illustrates the removal of the lower portion of protective material from the pod.
Figure 23:
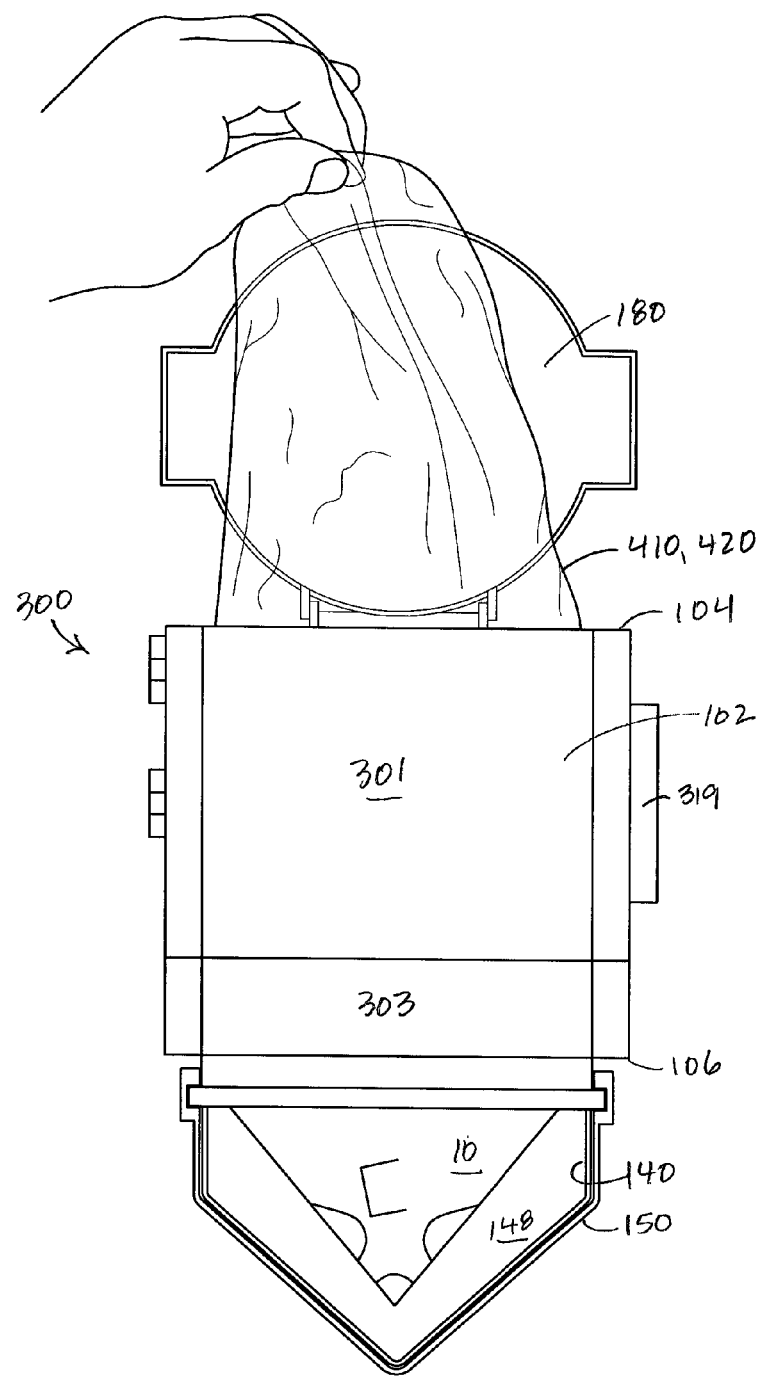
FIG. 23 illustrates the removal of the upper portion of the protective material from the pod.

Step 4. Removing the protective material 410 from the pod of strainers while the strainers are in the dispenser. In this step, the user grasps the gripping area 426 of the protective material, and pulls the material along a generally axial direction of the dispenser in a direction away from the conical tip 18 of the lower and outer-most strainer 10 (FIG. 22). This action causes the lower portion 422 of protective material 410 to separate from the pod 412 and be withdrawn from the dispenser 300 through the opening 148 in the skirt 140, while the upper portion 420 remains in place about the stack 80. The user then grasps the upper portion 420 of the protective material 410, for example in the vicinity of the upper-most strainer 10, and pulls the material 410 along a generally axial direction of the dispenser 300 in a direction toward an open end of the upper-most strainer 10 (FIG. 23). This action causes the upper portion 420 of protective material 410 to be withdrawn from the dispenser 300 through the opening in the front half 308 of the dispenser body 102.

It has been found that removal of protective material 410 through the top of the dispenser 300, in a direction away from the apex 18 of the strainer 10, acts to reduce compaction of the stack 80 of strainers 10, thereby facilitating the dispensing in the subsequent stage.

Step 5. Closing the lid 180 and skirt door 150 so that the stack 80 is enclosed within the dispenser 300.

Individual strainers 10 can then be dispensed from the dispenser 300 as described above in the method of dispensing.

The method described here provides a stack 80 of strainers 10 that is loaded into a dispenser 300 without direct contact with the stack 80 or any strainer 10 included therein, whereby contamination of the strainers 10 during loading, particularly due to contact with body oils, is minimized.

Although the step of removing the protective material 410 is described here as removing the lower portion 422 of protective material before removing the upper portion 420 of protective material, the method is not limited to this sequence. For example, once the pod 412 is placed in the dispenser 300, the upper portion 420 can be removed before the lower portion 422. In this case, placement of the perforation line 418 within the cylindrical portion 414 rather than the conical portion 416 would facilitate removal of the protective material.

In addition, although the step of removing the protective material 410 is describe here such that the protective material remains intact during loading and until the gripping area 426 is pulled, the method is not limited to this. For example, to facilitate separation of the protective material 410, the perforation line may be partially separated prior to loading of the pod 412 into the dispenser 310. Of course, care would be taken to create the partial separation and load the pod 412 into the dispenser 310 without touching the strainers 10 within the pod 412.

A selected illustrative embodiment of the invention is described above in some detail. It should be understood that only structures considered necessary for clarifying the present invention have been described herein. Other conventional structures, and those of ancillary and auxiliary components of the system, are assumed to be known and understood by those skilled in the art. For example, instead of manually gripping the dispensing tab, it would be obvious to those skilled in the art to design a lever that could contact the dispensing tab and push the strainer downward, allowing it to drop free of the dispenser. Moreover, while a working example of the present invention has been described above, the present invention is not limited to the working example described above, but various design alterations may be carried out without departing from the present invention as set forth in the claims.

What is claimed is:

1. A method for using a paint strainer dispenser comprising:
    retrieving a conical paint strainer from the paint strainer dispenser while minimizing contamination of the conical paint strainer, the conical paint strainer including a conical body having an open end defined by a rim at a first end and an apex at a second opposite end, retrieving the conical paint strainer from the paint strainer dispenser including:
        opening a chamber door of a chamber to expose a portion of a first end of a stack of conical paint strainers within the chamber, the first end of the stack of conical paint strainers including an outermost conical paint strainer;
        grasping a first portion of the outermost conical paint strainer of a sufficient size to be grasped between fingers, while avoiding contact with a second portion of the conical paint strainer, the first portion of the conical paint strainer being formed of an imperforate material and a second portion of the conical paint strainer being formed of a perforated material, wherein grasping the first portion of the outermost conical paint strainer includes grasping a dispensing tab, positioned between the rim and the apex, and extending from an outer surface of the first portion of the outermost conical paint strainer;
        applying a force on the outermost conical paint strainer for causing separation of the outermost conical paint strainer from the stack of conical paint strainers; and
        removing the outermost conical paint strainer from the chamber of the dispenser including pulling downward on the conical paint strainer while rotating the apex outward.

2. The method for using a paint strainer dispenser of claim 1, further comprising:
    loading a stack of conical paint strainers within a dispenser while minimizing strainer contamination, comprising the steps of:
    providing the stack of strainers that is enclosed within a protective material;
    placing the enclosed stack of strainers in the dispenser; and
    removing the protective material from the stack of strainers while the stack of strainers is in the dispenser.

3. The method of to claim 2 where the protective material is configured to be separable into individual portions, and the step of removing includes removing a first portion of the protective material while a second portion of the protective material remains within the dispenser.

4. The method of claim 3 wherein the protective material includes a perforated portion, and removing the protective material includes separating the first portion of the protective material from the second portion of the protective material along the perforated portion.

5. The method of claim 3 wherein the step of removing the protective material further includes subsequent removal of the second portion of the protective material from the dispenser.

6. The method according to claim 3 wherein removing the first portion of the protective material includes gripping a gripping area of the first portion of the protective material, the gripping area extending beyond a conical tip of an outermost strainer of the stack of strainers and pulling on the gripping area to cause separation of the first portion of the protective material from the second portion of the protective material.

7. The method according to claim 2 wherein removing the first portion of the protective material includes removing at least a portion of the protective material in a direction along a longitudinal axis of the stack of strainers and away from a conical tip of an outermost strainer of the stack of strainers.

8. The method of claim 1 further comprising closing the chamber door to cover the first end of the stack of conical paint strainers within the chamber.

9. The method of claim 1 wherein the dispenser comprises a skirt that defines the chamber and an opening; wherein the chamber door has an open position for allowing the outermost paint strainer to be removable and a closed position in which the opening of the skirt is covered to protect the conical paint strainers.

10. The method of claim 1 wherein removing the outermost conical paint strainer includes withdrawing the outermost conical paint strainer in a direction away from the longitudinal axis of the dispenser.

11. The method of claim 2 wherein placing the enclosed stack of strainers in the dispenser includes aligning the stack of trainers into a predefined alignment relative to the dispenser by inserting the enclosed stack of strainers into the dispenser such that at least some rim tabs disposed on one side of each strainer of the enclosed stack of strainers reside in a channel extending along a longitudinal axis of the dispenser.

12. The method of claim 1 further comprising removing a protective material from the stack of conical paint strainers.

13. The method of claim 1 wherein the force on the outermost conical paint strainer includes applying a force sufficient to temporarily deform the outermost conical paint strainer, thereby allowing the outermost conical paint strainer to pass one or more shoulder members on an interior surface of the dispenser.

14. The method of claim 1 wherein grasping the first portion of the outermost conical paint strainer while avoiding contact with a second portion of the conical paint strainer includes grasping a dispensing protrusion extending from an outer surface of the outermost conical paint strainer.

15. The method of claim 1 wherein opening the chamber door of the chamber includes grasping a handle disposed on the chamber door and applying force to the handle to rotate the chamber door about a longitudinal axis of the dispenser to expose the portion of a first end of a stack of conical paint strainers within the chamber.

16. The method of claim 2 wherein placing the enclosed stack of strainers in the dispenser includes opening a lid disposed at a first end of the dispenser to expose an opening at the first end of the dispenser, and inserting the enclosed stack of strainers into the opening at the first end of the dispenser.

17. The method of claim 16 wherein inserting the enclosed stack of strainers into the opening at the first end of the dispenser includes inserting the enclosed stack of strainers such that a first end of the enclosed stack of strainers including an outermost strainer is inserted into the dispenser before a second end of the enclosed stack of strainers is inserted into the dispenser.

18. The method of claim 17 wherein inserting the enclosed stack of strainers into the dispenser includes causing the first end of the enclosed stack of strainers including the outermost strainer to at least partially enter a dispensing chamber disposed proximal to a second end of the dispenser.

19. The method of claim 16 wherein placing the enclosed stack of strainers in the dispenser further includes closing the lid at the first end of the dispenser.

20. The method of claim 16 wherein inserting the enclosed stack of strainers into the opening at the first end of the dispenser includes inserting the enclosed stack of strainers to a depth in the dispenser such that an end of the enclosed stack of strainers engages one or more shoulder members disposed on an interior surface of the dispenser proximal to a second end of the dispenser.

* * * * *